United States Patent
Choi et al.

(10) Patent No.: US 9,457,322 B2
(45) Date of Patent: Oct. 4, 2016

(54) POROUS COMPOSITE MEMBRANE

(75) Inventors: Wai-Ming Choi, West Newton, MA (US); Kiminori Kataoka, Kawaguchi (JP)

(73) Assignee: Entegris, Inc., Billerica, MA (US)

( * ) Notice: Subject to any disclaimer, the term of this patent is extended or adjusted under 35 U.S.C. 154(b) by 1003 days.

(21) Appl. No.: 13/255,349

(22) PCT Filed: Apr. 12, 2010

(86) PCT No.: PCT/US2010/030691
§ 371 (c)(1),
(2), (4) Date: Oct. 17, 2011

(87) PCT Pub. No.: WO2010/120668
PCT Pub. Date: Oct. 21, 2010

(65) Prior Publication Data
US 2012/0061314 A1    Mar. 15, 2012

Related U.S. Application Data

(60) Provisional application No. 61/168,776, filed on Apr. 13, 2009.

(51) Int. Cl.
*B01D 69/12* (2006.01)
*B01D 69/00* (2006.01)
*B01D 67/00* (2006.01)

(52) U.S. Cl.
CPC ........... *B01D 69/12* (2013.01); *B01D 67/0088* (2013.01); *B01D 2323/39* (2013.01)

(58) Field of Classification Search
None
See application file for complete search history.

(56) References Cited

U.S. PATENT DOCUMENTS

| | | |
|---|---|---|
| 4,127,706 A | 11/1978 | Martin et al. |
| 5,698,281 A | 12/1997 | Bellantoni et al. |
| 7,008,465 B2 | 3/2006 | Graham et al. |
| 7,029,821 B2 | 4/2006 | Carey et al. |
| 7,875,380 B2 | 1/2011 | Chun et al. |
| 2005/0227172 A1 | 10/2005 | Ozaki et al. |
| 2007/0125703 A1 | 6/2007 | Chapman et al. |
| 2007/0221567 A1* | 9/2007 | Simmons ............. B01D 67/002 210/500.36 |

(Continued)

FOREIGN PATENT DOCUMENTS

| | | |
|---|---|---|
| CN | 1276262 | 12/2000 |
| CN | 1338970 | 3/2002 |

(Continued)

OTHER PUBLICATIONS

Yoshimatsu, K., et al., "Selective Molecular Adsorption Using Electrospun Nanofiber Affinity Membranes," (Abstract only) [online] [retrieved on Jan. 26, 2009] retrieved from the Internet URL: http://www.ncbi.nlm.nih.gov/pubmed/18226521.

(Continued)

*Primary Examiner* — Krishnan S Menon
(74) *Attorney, Agent, or Firm* — Hamilton, Brook, Smith & Reynolds, P.C.

(57) ABSTRACT

Embodiments of the invention include a liquid filter member that includes a layer of polymeric nano fibers overlying a microporous membrane. A pressure drop of the filter member is substantially the same, or is less than, a pressure drop of the microporous membrane and the filter member has a particle retention in the presence of surfactant that is greater than the particle retention of the microporous membrane alone under the same test conditions.

16 Claims, 20 Drawing Sheets

(56) References Cited

U.S. PATENT DOCUMENTS

| | | | |
|---|---|---|---|
| 2008/0086992 A1 | 4/2008 | Walz | |
| 2008/0134652 A1 | 6/2008 | Lim et al. | |
| 2008/0217239 A1 | 9/2008 | Chen et al. | |
| 2008/0307971 A1 | 12/2008 | Horie et al. | |
| 2008/0314010 A1 | 12/2008 | Smithies et al. | |
| 2009/0026137 A1* | 1/2009 | Chen et al. | 210/637 |
| 2009/0064648 A1 | 3/2009 | Chi et al. | |
| 2009/0078640 A1* | 3/2009 | Chu et al. | 210/321.6 |
| 2010/0038307 A1 | 2/2010 | Bates, III et al. | |
| 2010/0096327 A1 | 4/2010 | Gin et al. | |
| 2010/0139224 A1* | 6/2010 | Lim | B01D 39/163 55/486 |
| 2010/0282682 A1 | 11/2010 | Eaton et al. | |
| 2010/0307119 A1 | 12/2010 | Leung et al. | |
| 2012/0061314 A1 | 3/2012 | Choi et al. | |
| 2014/0061114 A1 | 3/2014 | Ramirez | |

FOREIGN PATENT DOCUMENTS

| | | |
|---|---|---|
| JP | H06218253 | 8/1984 |
| JP | H07-72145 | 3/1995 |
| JP | 2006-326579 A | 12/2006 |
| JP | 2007-075739 A | 3/2007 |
| JP | 2007-301436 A | 11/2007 |
| JP | 2008-526485 | 7/2008 |
| JP | 2008-210063 A | 9/2008 |
| JP | 2010/520053 | 6/2010 |
| JP | 2011-502775 | 1/2011 |
| JP | 2012/506091 | 2/2012 |
| WO | WO 01/41905 A1 | 6/2001 |
| WO | WO 2004/069959 A2 | 8/2004 |
| WO | WO 2004/112183 A1 | 12/2004 |
| WO | WO 2006/069307 A2 | 6/2006 |
| WO | WO 2006/069307 A3 | 6/2006 |
| WO | WO 2008/109117 A1 | 9/2008 |
| WO | WO 2010/065949 A1 | 6/2010 |
| WO | WO 2010/120668 | 10/2010 |
| WO | WO 2012/154790 | 11/2012 |

OTHER PUBLICATIONS

Zhang, H. et al., "Electrospun Nylon Nanofiber as Affinity Membrane for Papain Adsorption," p. 1, (Abstract only, [retrieved on Jan. 26, 2009] *Journal of Biotechnology*, vol. 136 (1), p. S16, retrieved from the Internet URL: http://www.sciencedirect.com/science?_ob=ArticleURL&_udi=B6T3C-4TPDVV5-15X& . . . .

Agarwal, S., et al., "Electrospinning of Fluorinated Polymers: Formation of Superhydrophobic Surfaces," p. 1, (Abstract only) [retrieved on Jan. 9, 2009] retrieved from the Internet URL: http://www3.interscience.wiley.com/journal/112649635/abstact?CRETRY=1&SRETRY=0 . . . .

"Can Protective Garments be Wearable Filters," *AFS American Filtration & Separations Society*, pp. 1-2, [retrieved on Jan. 21, 2009], retrieved from the Internet URL: http://www.afssociety.org/education/0906oneminute.htm.

Hegde, R., et al., "Nanofiber Nonwovens," *Nanofibers*, pp. 1-7, [retrieved on Jan. 9, 2009] retrieved from the Internet URL: http://www.engr.utk.edu/mse/Textiles/Nanofiber%20Nonwovens.htm.

Graham, K., et al., "Incorporatin of Electrospun Nanofibers into Functional Structures," *Nonwovens Perspective, US Army Soldier Systems Center*, pp. 21-27 (2004).

Ma, Z., et al., "Electrospun Cellulose Nanofiber as Affinity Membrane,", *Journal of Membrane Science*, vol. 265, Issues 1-2, pp. 115-123 (Abstract only pp. 1-2), [retrieved on Jan. 26, 2009] retrieved from the Internet URL: http://www.sciencedirect.com/science?_ob=ArtieleURL&_udi=B6TGK-4GG2J1C-1&_us . . . .

Zhang, H., et al., "Nanofiltration Maintains Photochemical Integrity," *Entegris, Inc.*, pp. 1-7 (2007).

Notification Concerning Transmittal of International Preliminary Report on Patentability for International Application No. PCT/US2010/030691 dated Oct. 27, 2011.

Entegris, Inc., "Impact® 2-Duo and Duo LRN Disposable Filters," Data Sheet, 4 pages, Apr. 2011.

Extended European Search Report dated Oct. 16, 2014 from European Application No. EP 12781784, entitled "Porous Composite Membrane Including Microporous Membrane Layers and Nanofiber Layer".

International Preliminary Report on Patentability mailed Nov. 21, 2013 from International Application No. PCT/US2012/037031, entitled "Porous Composite Membrane Including Microporous Membrane Layers and Nanofiber Layer".

Wu, A., "A New Dual-Functionality Filter for Defect Reduction of Advanced Lithography Processes", Entegris, Inc., 7 pages, Dec. 2007.

International Search Report for Int'l Application No. PCT/US2010/030691; Date Mailed: Sep. 7, 2010 (2 pages).

Notification of Transmittal of the International Search Report and Written Opinion of the International Searching Authority for counterpart International Application No. PCT/US2010/030691, dated Sep. 7, 2010.

Entegris Inc., "Contamination Control Solutions Impact 2-Duo and Duo LRN Disposable Filters: Disposable Filters for Advanced Point-of-Use Photoresist Filtration," 4 pages, Jan. 1, 2007.

International Search Report and Written Opinion for Int'l Application No. PCT/US2012/037031, entitled "Porous Composite Membrane Including Microporous Membrane Layers and Nanofiber Layer", Date of Mailing: Nov. 28, 2012.

Frometa, A., et al., "Intercept Filters With Dual Retention Mechanisms for 65 NM Processes and Below," Entegris, Inc., www.Entegris.com (Sep. 2006).

Xiao, Y., et al., "Sub-30 NM Particle Retention Test by Fluorescence Spectroscopy," Entegris, Inc., www.Entegris.com. (Mar. 19-20, 2009).

Entegris, Inc., "Impact® 2-Duo Disposable Filters," Data Sheet, 4 pages, Jul. 2007.

Entegris, Inc., "Impact® 2-Duo Disposable Filters," Data Sheet, 4 pages, Jul. 2009.

Entegris, Inc., Impact 2-Duo and Duo LRN Disposable Filters: 4 pages, Apr. 2011.

Non-Final Office Action for U.S. Appl. No. 14/114,868, "Porous Composite Membrane Including Microporous Membrane Layers and Nanofiber Layer", mailed Apr. 7, 2016.

* cited by examiner

US 9,457,322 B2

POROUS COMPOSITE MEMBRANE

CROSS REFERENCE TO RELATED APPLICATIONS

This application is the U.S. National Stage of International Application No. PCT/US2010/030691, filed Apr. 12, 2010, which designates the U.S., published in English, and claims the benefit of U.S. Provisional Patent Application Ser. No. 61/168,776, filed Apr. 13, 2009. The entire teachings of the above applications are incorporated by reference herein.

BACKGROUND

U.S. Pub. No. 2008/0217239, discloses a liquid filter of a composite medium that has a nanoweb adjacent to and optionally bonded to a microporous membrane. The microporous membrane is characterized by an LRV value of 3.7 at a rated particle size, and the nanoweb has a fractional filtration efficiency of greater than 0.95 at the rated particle size of the microporous membrane. According to the disclosure, the nanoweb can be made by electrospinning or electroblowing. According to this disclosure, the composite medium can be used in the form of filter cartridges, in the form of a flat panel or cylindrical unit and can be used in a variety of filtering method applications, such as filtering both gaseous and liquid flows, semiconductor manufacture, and other applications. Examples of polyolefin based microporous films for use as the filtration membrane are described and the specification discloses electroblowing polyamide-6,6 in formic acid to form the nanoweb.

U.S. Pat. No. 7,008,465 discloses a layered filter media that uses a combination of active filtration layers including at least a high efficiency substrate and at least one fine fiber or nanofiber layer to effectively remove dust, dirt and other particulates. Such a substrate type can include HEPA media, fiberglass HEPA, ULPA media, 95% DOP media, melt blown media, electret media, cellulose/meltblown layered media, etc. The nanofiber layer and the high efficiency substrate are selected to obtain a balanced set of properties that permits the user to remove submicron particles efficiently at a relatively low-pressure drop. A high efficiency substrate (either a single layer or a layered substrate structure) has a particulate efficiency exceeding 80% when tested in accordance with ASTM 1215. According to the disclosure the fine fiber of the class of materials can have a diameter of about 0.01 to 5 microns. Such microfibers can have a smooth surface comprising a discrete layer of the additive material or an outer coating of the additive material that is partly solubilized or alloyed in the polymer surface, or both. Materials disclosed for use in the blended polymeric systems are nylon 6; nylon 66; nylon 6-10; nylon (6-66-610) copolymers and other linear generally aliphatic nylon compositions. The fine fibers can be made by electrospinning.

WO 2004/112183, discloses a complex membrane for an electrochemical device such as a lithium secondary battery. The complex membrane includes a micro-porous polyolefin membrane, and a web-phase porous membrane united to at least one side of the micro-porous polyolefin membrane and composed of nanofibers. According to the disclosure, the micro-porous polyolefin membrane is a membrane having at least one layer composed of polyethylene polymer and/or polyethylene polymer, and the micro-porous polyolefin membrane preferably has a thickness of 5 to 50 micron and a porosity of 30 to 80%. Further according to this disclosure the nanofiber preferably has a diameter of 50 to 2,000 nm. The web-phase porous membrane made of nanofibers may be formed on one surface of the micro-porous membranes by directly spinning a polymer solution by means of electrospinning.

Entegris Inc., Japanese Patent Application No. 2008-210063, filed Aug. 18, 2008 discloses and claims a polyamide non-woven fabric manufactured using and electrospinning method, wherein the fiber diameter is 50 nanometers to 200 nanometers, the 500 mL flow time as defined in the specification is 2-20 seconds, and the 0.144 micron PSL removal rate as defined in the specification is 40-100%. A filter unit having this non-woven fabric is claimed.

JP Publication No. 2007-301436, abstract, discloses an air filter medium that is provided with a sheet-like nanofiber structure layer with which the nanofiber is three-dimensionally entangled, an upstream side porous material layer which integrally overlies the surface of the filtration upstream side of the nanofiber structure layer and a downstream side porous material layer which is integrally laminated on the surface of the filtration downstream side of the nanofiber structure layer. The face which is integrally laminated with the nanofiber structure layer of the upstream side porous material layer and the downstream side porous material layer is flat and smooth with no fluffy projections. The downstream side porous material layer has gas permeability of which the pressure loss is 100 Pa or less at the air flow rate of 1 m/second.

JP Publication No. 2006-326579, abstract, discloses a filter medium that includes a polytetrafluoroethylene (PTFE) porous membrane, an air permeable support material, and a web layer composed of polymer fibers formed by an electrospinning method (charge induction spinning method or electrostatic spinning method). In the filter medium of this invention, an air permeable adhesive layer may be provided adjacently to the web layer. For example, the ranges of the average pore size of the PTFE porous membrane are 0.01 micrometer-5 micrometers. Nylon, polyethylene, and polypropylene electrospun fibers are disclosed.

JP Publication No. 2007-075739, abstract, discloses a filter unit that has a filter medium capturing particles contained in a to-be-filtrated gas and a supporting frame supporting the filter medium. The filter medium has a porous membrane of polytetrafluoroethylene (PTFE), a fibrous filter medium arranged so as to hold the PTFE membrane between the filter medium and a gas permeable supporting material. The fiber constituting the fibrous filter medium has an average fiber diameter of 0.02-15 μm (micron), and the gas permeable supporting material is composed of a fiber of an average fiber diameter of larger than 15 μm. The filter medium is supported with the supporting frame so that the fibrous filter medium lies in the downstream of the flow of the to-be-filtrated gas with respect to the PTFE membrane. According to the disclosure the fibrous filter medium can be electrospun.

WO/2004/069959 discloses filtering of crude resin solution which is a chemically amplified photoresist composition with an acid generator component. According to this disclosure, specific examples of filtration membrane materials include fluororesins such as PTFE (polytetrafluoroethylene); polyolefin resins such as polypropylene and polyethylene; and polyamide resin such as nylon 6 and nylon 66. The specification also discloses passing the crude resist resin solution through a two-stage filter using filtration membranes to effect removal of the polymer and oligomer by-products. In one specific example of the filtering process, the dilute crude resin solution is filtered through a nylon filter as the first filtration step, and the resulting filtrate is then filtered through a polypropylene filter as the second filtration step. A polyethylene filter was also disclosed as being used in this second filtration step.

United States Patent Application No. 20100038307 discloses filtration media including at least one layer of nanofibers having average diameters less than 1000 nanometers with optional porous substrate also referred to as a scrim layer(s). The porous substrates disclosed are spunbonded nonwovens, meltblown nonwovens, needle punched nonwovens, spunlaced nonwovens, wet laid nonwovens, resin-bonded nonwovens, woven fabrics, knit fabrics, apertured films, paper, and combinations thereof. The filtration media are disclosed as having mean flow pore sizes between about 0.5 micron and about 5 micron and are used for filtering particulate matter in liquid. The media are reported to have flow rates of at least 0.055 L/min/cm$^2$ at relatively high levels of solidity and non-diminishing flow rates as differential pressures increase between 2 psi (14 kPa) and 15 psi (100 kPa). This application does not disclose one or more nanofiber layers on a microporous membrane and does not disclose the use of asymmetric microporous membranes.

SUMMARY

In the conventional microporous membrane filter, especially the filter membranes having pore size from about 5 or 10 nanometer, or smaller, to 50 nanometer, it is difficult to improve liquid particle retention with smaller pore size without increasing the pressure drop or causing an increase in flow time for the microporous membrane. This is because improving the particle retention by reducing pore size contrarily results in deterioration of flow time due to the decrease in pore size. Combining microporous membranes, for instance, a combination of UPE microporous membrane and a nylon microporous membrane can improve particle retention but can result in a deterioration of flow time.

Liquid filtration members in versions of the present invention overcome these problems, the liquid filtration member comprises a nanofiber layer, the nanofiber layer can optionally formed on non-woven support, and the nanofiber layer is combined with a microporous membrane. The combination of the nanofiber layer, optional non-woven support, and microporous membrane provides a filter member with a flow time that is the less than, or a flow time that is substantially the same as, the flow time of the microporous membrane alone. The combination of the nanofiber layer, optional non-woven support, and microporous membrane has better particle retention in liquids than the microporous membrane alone in liquids. In some versions of the invention the microporous membrane is a polyolefin material, for example an ultra high molecular weight polyethylene microporous membrane (UHMWPE), and the nanofiber layer comprises a polyamide (PA) polymer or other polymer that can form a porous layer with particle retention properties. In some versions of the invention the microporous material is a polyamide such as but not limited to nylon 6 or nylon 6,6, and the nanofiber layer comprises a polyamide (PA) polymer or other polymer that can form a porous layer with particle retention properties. Versions of the invention result in a filter member that can be used for particle and gel removal from photoresists and the like. In some versions of the invention the nanofiber is a nylon nanofiber which can retain particles from a liquid with its charge whereby the particle retention is improved without significantly affecting flow time. In some versions of the invention the microporous membrane is made from UPE, the nanofiber layer is a nylon material, and the non-woven support is also a nylon material.

One version of the invention is a filter member comprising a layer of polymeric nanofibers overlying a microporous membrane, the layer of polymeric nanofibers contacts a surface of the microprous membrane. Optionally the filter member includes a non-woven support and the nanofiber layer is interposed between the non-woven porous support and the microporous membrane. A pressure drop of the filter member is substantially the same, or is less than, a pressure drop of the microporous membrane of the filter member alone. In addition, the filter member has a liquid particle retention under sieving or essentially sieving conditions that is greater than the liquid particle retention under sieving or essentially sieving conditions of the microporous membrane alone.

Versions of the invention include a filter member comprising one or more layers of nanofibers that overlie a microporous membrane. The filter member may optionally include one or more non-woven supports and optionally one or more additional support layers or drainage layers. The one or more layers of polymeric nanofibers overlie a surface of the microporous membrane, at least one layer of polymeric nanofibers contacts a surface of the microprous membrane. Optionally the filter member includes a non-woven support and a nanofiber layer is interposed between the non-woven porous support and the microporous membrane. A pressure drop of the filter member is substantially the same, or is less than, a pressure drop of the microporous membrane and optional supports and the filter member and has a liquid particle retention under sieving or essentially sieving conditions that is greater than the liquid particle retention under sieving or essentially sieving conditions of the microporous membrane alone. The bubble point of the various layers in a filter member can decrease with each layer starting from the microporous membrane and moving toward the outer porous support layer. The bubble point of each layer in the filter member can be determined by separating the layers and measuring the bubble point of each one in a suitable liquid.

In some versions of the invention that comprise one or more nanofiber layers, a first nanofiber layer is interposed between the microporous membrane and a first support layer; subsequent nanofiber layer and support layer pairs are position atop the first support layer with the subsequent nanofiber layer contacting an upper surface of the first support layer. The microporous membrane of the filter member has a size rating and can be characterized by a bubble point of greater than 0.206 MPa and an IPA flow time greater than 500 seconds for 500 milliliters of isopropyl alcohol at a pressure of 0.10 MPa and temperature of 21° C. The filter member further comprises a nanofiber layer overlying a surface of the microporous membrane, the size rating of the nanofiber layer is the same or larger than the size rating of the microporous membrane. Optionally the filter member includes a support such as but not limited to a non-woven support for the nanofiber layer with the nanofiber layer positioned between the microporous membrane and the support. The nanofiber(s) comprising the nanofiber layer can have a diameter or an average diameter in a range of 100 nanometers to 150 nanometers. The nanofiber layer, which may optionally include a support layer, is characterized by an isopropyl alcohol (IPA) flow time of 20 seconds to 200 seconds, or about 20 seconds to 200 seconds, for 500 milliliters of IPA at a pressure of 0.10 MPa and temperature of 21° C. The filter member IPA flow time is no greater than 100 seconds more than the IPA flow time of the microporous membrane for 500 milliliters of IPA at a pressure of 0.10 MPa and temperature of 21° C. The filter member has a liquid particle retention for approximately 25 nanometer fluorescent polystyrene latex beads, at 10% monolayer coverage or more with a surfactant such as 0.3 wt % sodium dodecylsulfate (SDS), that is substantially the same or is greater than a liquid particle retention of the microporous membrane for the 25 nanometer fluorescent polystyrene latex beads under the same conditions.

Another version of the invention is a filter member comprising a microporous membrane, the microporous membrane has a size rating characterized by a bubble point of greater than 0.206 MPa and an IPA flow time greater than 500 seconds for 500 milliliters of isopropyl alcohol at a pressure of 0.10 MPa and temperature of 21° C. The filter member further comprises a nanofiber layer overlying a surface of the microporous membrane, the size rating of the nanofiber layer is the same or larger than the size rating of the microporous membrane. Optionally the filter member includes a support such as but not limited to a non-woven support for the nanofiber layer with the nanofiber layer positioned between the microporous membrane and the support. The nanofiber(s) comprising the nanofiber layer can have a diameter in a range of 25 nanometers to 250 nanometers. The nanofiber layer, which may optionally include a support layer, is characterized by an isopropyl alcohol (IPA) flow time of 20 seconds to 200 seconds, or about 20 seconds to 200 seconds, for 500 milliliters of IPA at a pressure of 0.10 MPa and temperature of 21° C. The filter member IPA flow time is no greater than 100 seconds more than the IPA flow time of the microporous membrane for 500 milliliters of IPA at a pressure of 0.10 MPa and temperature of 21° C. The filter member has a liquid particle retention for approximately 25 nanometer fluorescent polystyrene latex beads, at 10% monolayer coverage or more with a surfactant such as 0.3 wt % sodium dodecylsulfate (SDS), that is substantially the same or is greater than a liquid particle retention of the microporous membrane for the 25 nanometer fluorescent polystyrene latex beads under the same conditions.

In still yet another version of the invention is a filter member comprising a microporous membrane having a size rating by an isopropyl alcohol bubble point greater than 206,000 Pa, the microporous membrane has an IPA Flow time of greater than 500 seconds for 500 milliliters of isopropyl alcohol at a pressure of 0.10 MPa and temperature of 21° C. The filter member further comprises a non-woven substrate or a non-woven support with a nanofiber layer on a surface of the non-woven support, the nanofiber layer comprising one or more nanofibers. The filter member has a liquid pressure drop for a liquid feed solution that is 0.1% (w/w) Triton X-100 in water at a flow rate of 30 milliliters/minute at room temperature that is between 0% and 15% less than the pressure drop of the microporous membrane alone in the liquid feed solution. The filter member also has a liquid particle retention for approximately 25 nanometer fluorescent polystyrene latex beads, at test conditions of 1% monolayer coverage to 5% monolayer coverage with 0.3 wt % sodium dodecylsulfate surfactant in the test liquid, that is substantially the same or is greater than the liquid particle retention of the microporous membrane for the same 25 nanometer fluorescent polystyrene latex beads under the same test conditions and test liquid composition.

DESCRIPTION OF DRAWINGS

In the drawings NF is an abbreviation for "nanofiber", NNF is an abbreviation for "nylon nanofiber", UPE is an abbreviation for "ultra high molecular weight polyethylene", and ML is an abbreviation for "monolayer".

DESCRIPTION

Figure 1:
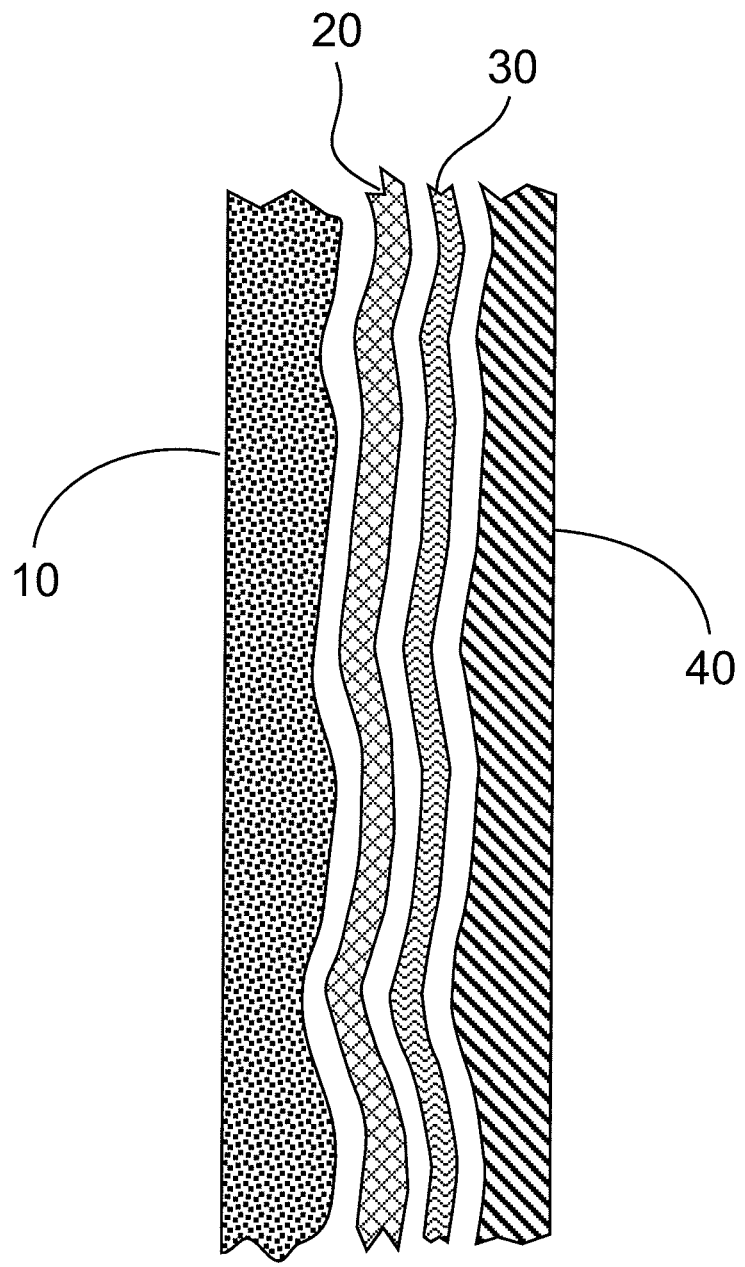
FIG. 1 is an exploded view of a filter member illustrating a non-woven porous support layer with a nanofiber layer interposed between a microporous membrane and second non-woven porous support layer.

While various compositions and methods are described, it is to be understood that this invention is not limited to the particular molecules, compositions, designs, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "nanofiber" is a reference to one or more nanofibers and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of embodiments of the present invention. All publications mentioned herein are incorporated by reference in their entirety. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some embodiments the term "about" refers to ±10% of the stated value, in other embodiments the term "about" refers to ±2% of the stated value. While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups or closed member groups.

In photoresist filtration, nylon microporous membrane filters provide good filtration performance and result in low bridging defects. As the linewidths in integrated circuits continue to become smaller in width, high efficiency filters for smaller particles are needed. One attempt to provide a smaller particle retention filter is to use a nylon membrane together with a second microporous membrane layer of with a smaller size rating. Ultra high molecular weight polyethylene membranes can be used to construct such a filter. Although this type of composite filter has high filtration efficiency, it also has corresponding higher pressure drop/flow restriction. Without wishing to be bound by theory, the higher pressure drop is believed to be due to the overlap of non-porous areas of the nylon microporous membrane filter layer over pores of the underlying microporous ultra high molecular weight polyethylene membrane.

Historically, the way to remove particles from liquids was to use a filter media with a pore size close to the particle size that needed to be removed. Therefore to remove 0.1 micron particles from a liquid, a membrane typically with size rating from below 0.1 to 0.2 microns was used. To remove 50 nanometer (nm) particles, a filter media with a size rating below 100 nm, for example around 75 nm to 50 nm or less can be used. This is the general practice in removal of submicron particles from a liquid stream. This is different than the common practice in air or gas streams where the filter pore size can generally be at least an order of magnitude larger than the particle size to be removed. In the manufacturing of semiconductors, with the gate length now expected to diminished to 30 nanometers in the next few years, the removal of particles above 25 nanometers from processing liquid chemicals and other cleaning liquids is key to the yield of the semiconductors.

One conventional microporous membrane used in the filtration of particles from liquids are symmetric UPE (UPE also refers to ultra high molecular weight polyethylene (UHMWPE)) microporous membranes having for example a size rating based on the average measured bubble point in the range of 10 nm to 50 nm. These microporous membranes will have some restriction in flow, a higher flow time, due to their smaller pore size as compared to a microporous membrane having a size rating of for example 100 nm based on the measured bubble point. To offset flow restriction of microporous membranes with smaller size ratings, a UPE microporous membrane with an asymmetric pore size or size rating distribution has been developed to reduce flow loss and achieve high particle retention rates. Asymmetric microporous membranes improve the flow of liquid through the larger pore and open portion of the membrane while removing particles using the smaller and tighter pore portion of the membrane. These asymmetric microporous membranes provided good 25 nanometer particle removal efficiency from liquid streams.

The inventors have discovered that for liquid filtration, the combination of a porous nanofiber layer with a microporous membrane can be used to provide a porous filter member that has higher retention for small aspect particles, for example 0.144 micron particles or smaller, 0.1 microns particles or smaller, 0.055 micron particles or smaller, in some cases 30 nanometer particles or smaller, and in still other cases particles with a larges aspect of between about 21 nm and 24 nm, and that has substantially the same or a decreased pressure drop compared to the microporous membrane alone. This combination of microporous membrane and porous nanofiber layer improves particle retention compared to the microporous membrane alone and in some cases without the attendant increase in pressure drop or an increase in flow time.

FIG. 1 is an exploded view of a filter member illustrating a non-woven porous support layer 10 with a nanofiber layer 20 interposed between a microporous membrane 30 and second non-woven porous support layer 40. In a filter member the layers would contact each other and form a single filter member. The thickness of the layers is not to scale. In some versions of the invention the pore structure of the microporous membrane is asymmetric and the side of the microporous membrane with the largest pores faces or is in contact with the overlying nanofiber layer. The layers may be pleated.

Figure 2A:
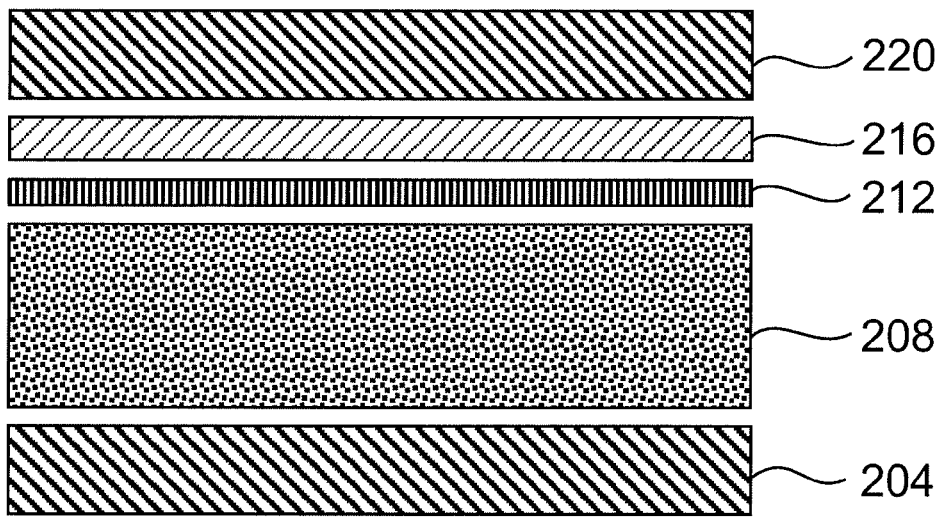
FIG. 2A is an illustration of a version of the invention that has a first porous support layer or drainage layer, a microporous membrane overlying the porous support layer, a nanofiber layer overlying the microporous membrane, a non-woven porous support layer overlying the nanofiber layer, and a second porous support layer or drainage layer overlying the non-woven porous support layer.
Figure 2B:
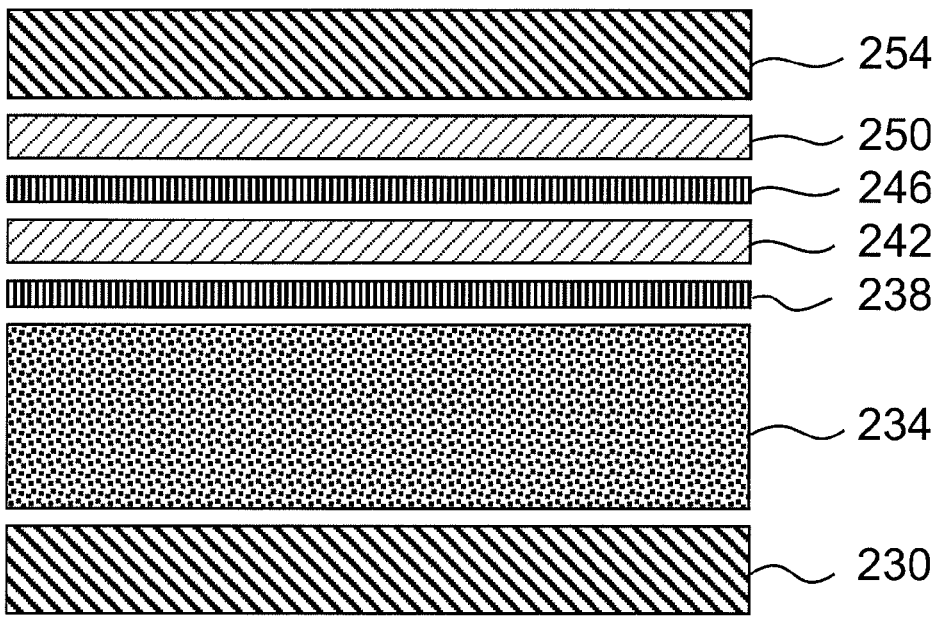
FIG. 2B is an illustration of a version of the invention with more than one nanofiber layer.

FIG. 2A is an illustration of a version of the invention that has a first porous support layer or drainage layer 204, a microporous membrane 208 overlying the porous support layer 204, a nanofiber layer 212 overlying the microporous membrane 208, a non-woven porous support layer 216 overlying the nanofiber layer 212, and a second porous support layer or drainage layer 220 overlying the non-woven porous support layer 216. The layers in some versions of the invention can be pleated. FIG. 2B is an illustration of a version of the invention with more than one nanofiber layer. In FIG. 2B the filter member has a first support layer or drainage layer 230, a microporous membrane 234 overlying the support layer or drainage layer 230, a first nanofiber layer 238 overlying the microporous membrane 234, a first non-woven layer 242 overlying the first nanofiber layer 238, a second nanofiber layer 246 overlying the first non-woven layer 242, a second non-woven layer 250 overlying the second nanofiber layer 246, and a second support layer or drainage layer 254 overlying the non-woven layer 250. The nanofiber layers 212, 238, 246 may independently be composed of sublayers of nanofibers (not shown). The layers in some versions of the invention can be pleated. The thickness of the layers illustrated in FIG. 2A and FIG. 2B are not to scale.

One version of the invention is a liquid filter member comprising a layer of polymeric nanofibers overlying a microporous membrane, a liquid pressure drop of the filter member in a test liquid is substantially the same, or is less than, a liquid pressure drop of the microporous membrane in the test liquid. The filter member has a particle retention in the presence of surfactant, in some cases under sieving or essentially sieving conditions, for test particles that is greater than the particle retention under the same test conditions of the microporous membrane for the test particles. The nanofiber layer can be characterized in some versions of the invention as having a size rating larger than the test particles and the nanofiber layer has increasing portion of overall particle retention in the presence of a surfactant in a test liquid with increasing test particle monolayer percent coverage of the filter member. Some versions of the invention further include a porous support for the nanofiber layer, the layer of polymeric nanofibers overlying the microporous membrane is positioned between, or interposed with, the porous support and the microporous membrane. In some versions of the invention the microporous membrane has pores with an asymmetric size distribution or structure, the asymmetry of the microporous membrane can be determined from an SEM image of a cross section of the microporous membrane.

In versions of the invention the bubble point or size rating of the various porous and microporous layers in the filter member can be about the same or decrease with each layer starting from the microporous membrane and moving toward the outer porous support layer. In some versions of the invention the bubble point of the various layers in a filter member can decrease, size rating becomes larger, with each layer starting from the microporous membrane and moving toward the outer porous support layer. For example as illustrated in FIG. 2B, the bubble point of the microprous membrane 234 can be the highest, the bubble point of the nanofiber layer 238 can be lower than the bubble point of the microporous membrane 234, the bubble point of the non-woven layer 242 lower than that of the nanofiber layer 238, and so on. The bubble point of each layer in the filter member can be determined by separating the layers and measuring the bubble point of each one in a suitable liquid.

In some versions of the invention the nanofiber layer can be about 5 microns to 10 microns in thickness and the size rating by IPA bubble point, or equivalent, of the nanofiber layer can be about 0.2 microns or less. The size rating of the nanofiber layer can be about an order of magnitude larger than the particles to be removed and can be determined by IPA bubble point. For example, for 25 nanometer particle removal, the size rating of the nanofiber layer can be about 200 nm to about 250 nm. The combination of this or similar nanofiber layer with an asymmetric membrane, for example an asymmetric UPE microporous membrane, with a rated size as determined by an HFE 7200 bubble point, or equivalent, of 5 nm or 10 nm results in improved 25 nm particle retention compared to just the UPE microporous membrane alone under similar test conditions. Also the combination of this or similar nanofiber layer with an asymmetric microporous membrane, for example a UPE microporous membrane, with rated size by IPA bubble point or equivalent, of 3 nm or 5 nm results in improved 25 nm particle retention compared to just the UPE microporous membrane alone under similar test conditions. This improvement in retention is totally unexpected considering the large size rating of the nanofiber layer(s). The other advantage of the invention is that there is a decrease in pressure drop or no significant increase in pressure drop through the filter member along with the improved particle retention. In some versions of the filter members of the invention with similar or improved particle retention, the pressure drop for the combination of nanofiber and microporous membrane is about 0% to 15% less, in other versions about 0% to 10% less, and in still other versions 0% to 5% less, than the pressure drop measured for the microporous membrane alone. In some versions of the filter members of the invention with similar or improved particle retention, the pressure drop for the combination of nanofiber and microporous membrane is within ±15% of the pressure drop for the microporous membrane alone that is in the filter member; in other versions of the filter member with similar or improved particle retention, the pressure drop for the combination of nanofiber and microporous membrane is within ±10% of the pressure drop for the microporous membrane alone that is in the filter member; in still other versions of the filter member with similar or improved particle retention, the pressure drop for the combination of nanofiber and microporous membrane is within ±5% of the pressure drop for the microporous membrane alone that is in the filter member. Similar or improved particle retention and reduced pressure drop has been observed by the inventors in filtration liquids ranging from pH 6 to pH 7 with surfactant (essentially sieving or sieving conditions) and from pH 6 to pH 8 without surfactant or wetting agent (non-sieving conditions).

The drainage layers, for example layers 204 and 220 in FIG. 2A can be a polymeric netting made of various polymers used for the other layers of the filter member. The size rating of the drainage layer is the same or larger than the size rating of adjacent layers. In one embodiment the drainage layer is made of polyethylene and such netting is available from Delstar, Del.

One version of the invention is a filter member comprising a microporous membrane that is 0.01 micron to 0.1 micron rated as determined by a bubble point measurement, in some cases the microporous membrane has an isopropyl alcohol bubble point greater than 30 pounds per square inch (psi) or greater than 206,000 Pascal (0.206 MPa). In versions of the invention the microporous membrane is further characterized by an IPA Flow time greater than 500 seconds, in some cases in a range of 500 seconds to 6500 seconds, for 500 milliliters of IPA at a pressure of 0.10 MPa and temperature of 21° C. The filter member further comprises a non-woven porous substrate or a non-woven porous support with a nanofiber layer on a surface of the non-woven porous support, the nanofibers in the nanofiber layer can have a diameter in a range of 25 nanometers to 250 nanometers, in some cases a diameter in a range of 50 nanometers to 200 nanometers, formed on the non-woven porous support by electro-spinning. The nanofiber layer is characterized by an isopropyl alcohol (IPA) flow time of 20 seconds to 200 seconds for 500 milliliters of IPA at a pressure of 0.10 MPa and temperature of 21° C.; the size rating of the nanofiber layer can be 0.01 micron to 0.5 microns, and in some cases from 0.1 microns to 0.3 microns as determined by an IPA bubble point measurement or equivalent. The filter member flow time is within 100 seconds, for 500 milliliters of IPA at a pressure of 0.10 MPa and temperature of 21° C., of the flow time of the microporous membrane. The filter member has a liquid particle retention for approximately 25 nanometer Duke Scientific G-25 fluorescent polystyrene latex beads at 10% monolayer coverage or more, in some versions at 10% monolayer coverage to 30% monolayer coverage, with 0.3 wt % sodium dodecylsulfate (SDS) surfactant, such that the liquid particle retention of the filter member is substantially the same or is greater than the liquid particle retention of the microporous membrane for the 25 nanometer fluorescent polystyrene latex beads under the same conditions. In some versions of the invention the nanofiber layer is interposed between the non-woven support and the microporous membrane. In some versions of the invention the nanofiber layer comprises or consists of a polymer composition that is different from the polymer composition of the microporous membrane whereby the zeta potential of the nanofiber layer and the zeta potential of the microporous membrane layer are different in an aqueous test liquid. In some versions of the invention the microporous membrane is made from UPE, the nanofiber layer is a nylon material, and the non-woven support is a nylon material.

The filter member comprising the nanofiber layer and microporous membrane can also have a liquid particle retention for approximately 25 nanometer Duke Scientific G-25 fluorescent polystyrene latex beads, at 1% monolayer coverage to 5% monolayer coverage from a test liquid with the particles and with 0.1% wt/wt Triton X-100 surfactant, that is substantially the same or is greater than the liquid particle retention of the microporous membrane alone for the same 25 nanometer fluorescent polystyrene latex beads under the same conditions; the filter member has lower pressure drop than the microporous membrane alone. In some versions of the invention the filter member has a liquid particle retention for approximately 25 nanometer Duke Scientific G-25 fluorescent polystyrene latex beads at 1% monolayer coverage from a test liquid ((with 0.1% (w/w) Triton X-100 surfactant) that is 5% or more than the liquid particle retention of the microporous membrane alone for the same 25 nanometer fluorescent polystyrene latex beads under the same conditions and the filter member has a liquid particle retention for approximately 25 nanometer Duke Scientific G-25 fluorescent polystyrene latex beads at 5% monolayer coverage from a test liquid (with 0.1% (w/w) Triton X-100 surfactant) that is 25% or more than the liquid particle retention of the microporous membrane for the same 25 nanometer fluorescent polystyrene latex beads under the same conditions; the filter member has lower pressure drop than the microporous membrane alone.

One version of the invention is a 10 nanometer UPE microporous membrane from Entegris combined with a porous non-woven support (Asahi-kasei NO5040) that has a nanofiber layer (nylon nanofiber diameter of 60 nanometer to 150 nanometer with thickness 5 micron and weight basis of 2 g/m² formed by Finetex). The nanofiber is formed by Finetex with electro spinning onto the substrate supplied by Asahi Kasei.

Versions of the invention includes a filter member comprising at least one nanofiber layer that comprises polymeric nanofibers adjacent to a microporous filtration membrane, wherein portions of the nanofibers in the nanofiber layer overlies portions of pores of the microporous membrane. The nanofiber layer is porous and has a sieving or non-sieving particle retention that is less than the sieving or non-sieving particle retention microporous membrane alone for a given particle size at a monolayer coverage of the particles between about 1% and 30% monolayer. The combination of the nanofiber layer and the microporous membrane of the filter member can result in a particle retention that is greater than the sieving or non-sieving particle retention of either the nanofiber layer or microporous membrane alone and the pressure drop across the combination of the nanofiber layer adjacent to the microporous membrane is substantially the same or is less than the pressure drop across the microporous membrane alone. In some versions of the invention the nanofiber layer is between a non-woven support and the microporous membrane. Other versions of the invention include a filter members that comprises one or more layers of nanofibers, a microporous membrane, one or more layers of non-woven supports, and one or more additional support layers or drainage layers.

Substantially the same pressure drop or about the same pressure drop refers to composite membrane or filter members in versions of the invention where the pressure drop for the filter member is within ±15 percent of the microporous membrane alone, in some versions of the invention the pressure drop for the filter members is within ±10 percent of the microporous membrane alone, and in still some other versions of the invention the pressure drop for the filter member is within ±5 percent of the microporous membrane alone.

In versions of the invention the thickness of the porous nanofiber layer can range from 0.005 microns to 30 microns. In some versions of the invention the thickness of the nanofiber layer is between 2 microns and 10 microns. In other versions of the invention the thickness of nanofiber layer can be between 5 nanometers and 20 nanometers. The thickness of the nanofiber layer is chosen, in combination with the microporous membrane and optional support layers to provide a filter member with a pressure drop that is substantially the same or is less than the pressure drop of the microporous membrane alone.

For purposes of the description and claims the term microporous membrane will be used to include porous membranes that may also be described by terms such as ultraporous membranes, nanoporous membranes, and microporous membranes. These microporous membranes retain feed stream components (retentate) such as but not limited to gels, particles, colloids, cells, poly-oligomers, while components substantially smaller than the pores pass through the pores into a permeate steam. Retention of components in the feed stream by the microporous membrane can be dependent upon operating conditions, for example face velocity and use of surfactants, pH and combinations of these and can be dependent upon the size and structure (hard particle or gel) of the particle relative to the size, structure and distribution of the microporous membrane pores.

In versions of the invention the nanofiber diameter or mean nanofiber diameter can range from 25 nanometers to 250 nanometers. In some versions of the invention the nanofibers have a diameter of 200 nanometers or less. In some versions of the invention the mean diameter of the nanofibers can between 75 nanometers and 200 nanometers.

In some versions of the invention the nanofibers have a diameter of 200 nanometers or less, or the mean diameter of the fibers is between 75 nanometers and 200 nanometers, and the air permeability of the nanofibers on a support layer is greater than 1.4 seconds/200 ml.

The size rating of the porous or microporous nanofiber layer can be at least as large or larger than the size rating of the microporous membrane surface that it overlies or is in contact with in the filter member. For example if the open side of an asymmetric microporous membrane is size rated by an IPA bubble point of about 1 microns, the size rating of the nanofiber layer should be about 1 micron or larger. The relative size of pores on facing surfaces of the microporous membrane and overlying nanofiber can also be assessed by SEM analysis.

In some versions of the invention the size rating of the nanofiber layer can range from 0.01 microns to 0.65 microns. In some versions of the invention the size rating of the nanofiber layer is 0.18 microns to 0.28 microns, in other versions about 0.18 microns to 0.24 microns, and in still other versions about 0.2 microns.

In some versions of the invention the nanofiber layer can be characterized by a bubble point the can be determined by an isopropyl alcohol (IPA) bubble point measurement or a bubble point measurement in a solvent like HFE 7200 from 3M™. The IPA bubble point of the nanofiber layers can range from about 5 psi to about 100 psi. In one version of the invention the porous nanofiber layer has a mean IPA bubble point of between 7 psi and 15 psi. In other versions of the invention the porous nanofiber layer has a mean IPA bubble point of between 15 psi and 20 psi. In other versions of the invention the nanofiber layer has an IPA bubble point between about 20 psi and about 25 psi. In still other versions of the invention the porous nanofiber layer has a mean IPA bubble point of between 24 psi and 32 psi. In yet still other versions the porous nanofiber layer has a mean IPA bubble point of between 32 psi and 50 psi. In still further versions the porous nanofiber layer has a mean IPA bubble point of between 50 psi and 83 psi.

The nanofiber layer in some versions of the invention the nanofiber layer can be characterized by an IPA bubble point of 20 psi±5 psi and an air permeability at 125 Pa of 1.2 cubic feet per minute (cfm) to 1.4 cfm measured using test method ASTM D737-96 (Frazier). In some versions of the invention the nanofiber layer are 0.18 microns to 0.28 microns rated, have a bubble point between 20 psi±5 psi, and or an air permeability of 1.2 cfm to 1.4 cfm. It is advantageous that the size rating of the nanofiber layer is about the same or is larger than the size rating of the underlying microporous membrane which results in reduced pressure drop for the filter member.

The nanofiber can be composed a polymer in versions of the invention that can be formed into a nanofiber. In some versions of the invention the nanofiber layer can be formed from a polyamide or polymers comprising a polyamide. In some versions of the invention the nanofiber polyamide is nylon 6, nylon 6,6 and the like. In other versions of the invention the polymer that forms the nanofiber is poly(ether sulfone). In some versions the invention the nanofiber has higher surface energy than the underlying microporous membrane polymer, for example, nylon has a greater surface energy than UPE. In other versions of the invention the nanofiber layer has a different zeta potential than the microporous membrane in an aqueous test liquid.

The porous nanofiber layers or layer can comprise or consist of nanofibers that can be produced by electrospinning, such as classical electrospinning or electroblowing, and in certain circumstances, by meltblowing or other such suitable processes. Classical electrospinning is a technique illustrated in U.S. Pat. No. 4,127,706, the teachings of which are incorporated herein by reference in its entirety, wherein a high voltage is applied to a polymer in solution to create nanofibers and nonwoven mats. In some versions of the invention the nanofiber layer has a base weight of between 0.1 gram per meter squared and 5 grams per meter squared; in other versions of the invention the nanofiber layer has a base weight of between 1 gram per meter squared and 3 grams per meter squared. In other versions of the invention the basis weight of the nanofiber layer is about 1.7 g/m² to 2 g/m². Smaller base weight nanofiber layers can be more economical to make and use less time and material.

The nanofiber layer can be free standing or it can be formed on a non-woven porous substrate or a non-woven porous support, it can be formed on the microporous membrane, or combinations of these. In some versions of the invention the nanofiber layer can be peeled from the non-woven support. In some versions of the invention the nanofiber layer is interposed between the non-woven support and the microporous membrane. In some version of the invention the support or non-woven support is optional. In some versions of the invention a nanofiber layer may comprise sublayers of nanofiber made for example by one or more passes of the spinning head back and forth across the microporous membrane, a non-woven porous support, or a web. The nanofiber composition, size rating, fiber diameter in each of the nanofiber sublayers can be the same or different.

The support on which the nanofiber layer can be formed is permeable to liquids and in some versions of the invention is chosen so that the flow time of the combination nanofiber layer and the microporous membrane is essentially the same or is less than the flow time of the microporous membrane alone. The support on which the nanofiber can be formed may be used to provide strength for the handling of the nanofiber web into the pleating/cartridge assembly process. Since the support can be a depth media, it may also act as a filter media. The combination of the nanofiber layer and the support form part of the filtration media in a filter cartridge. In some versions of the invention the flow time for the nanofiber layer on the support with the microporous membrane as illustrated in FIG. 1 is essentially the same, or is about the same, as the flow time for the microporous membrane alone. In some versions of the invention the support is a non-woven material. The support or non-woven support is chemically compatibility with the final liquid application. Non-limiting examples of non-woven supports include those made from polyamides (PA) and can include various nylons such as but not limited to (Nylon) 6, Nylon 6, 6, and aramides, poly(ethylene terephthalate) (PET), PES (polyether sulfone) and the like. PA6 refers to Polyamide 6 also referred to as (Nylon) 6 or Nylon 6. In some versions of the invention the nonwoven support comprises Nylon 6 resin that is heat bonded to reduce the chance of introduction other unwanted material (contamination) into the web via other processes. In one version of the invention the support on which the nanofiber layer is formed is nylon, NO5040, available from Asahi Kasei which does not affect, or does not substantially affect the flow time of the filter member. In some versions of the invention the flow time for the nanofiber layer on a non-woven supports ranges from about 20 seconds to 200 seconds. The basis weight of the nonwoven is related to its thickness and can be chosen to minimize pressure loss and may also be selected to provide the correct number of pleats for assembly into a filter pack. As the nonwoven gets thicker, it reduces the number of pleats that can fit into a fixed diameter center tube configuration of a filter cartridge. In some versions of the invention the non-woven support has a basis weight of about 40 grams per meter squared to about 30 grams per meter squared. In other versions of the invention the non-woven support has a basis weight of about (40±5) grams per meter squared Microporous membrane in some versions of the invention can have a morphology that includes the lacy open pore structure of microporous UPE membrane, or in some versions the membrane includes the string and node morphology of microporous PTFE (polytetrafluoroethylene) membrane. In some versions the morphology of the microporous membrane is a lacy open structure. The microporous membrane can have a size rating determined by bubble point measurement in isopropyl alcohol or 3M™ HFE-7200 of less than 0.1 micron. In some versions the size rating of the microporous membrane determined by bubble point measurement in isopropyl alcohol or 3M™ HFE-7200 is between 0.005 micron to 0.25 micron. In other versions of the invention the microporous membrane has a size rating determined by bubble point measurement in isopropyl alcohol or 3M™ HFE-7200 of from about 0.005 microns to about 0.05 microns. In still other versions of the invention the microporous membrane can have a size rating of from about 0.003 microns to about 0.05 microns determined by bubble point measurement in isopropyl alcohol or 3M™ HFE-7200. In further versions of the invention the microporous membrane can have a size rating of from about 0.001 microns to about 0.05 microns determined by bubble point measurement in isopropyl alcohol or 3M™ HFE-7200.

Microporous membranes in versions of the invention can be described as symmetric or asymmetric. Symmetric microporous membranes have a porous structure with a pore size distribution characterized by pores with an average size that is substantially the same through the membrane. In asymmetric microporous membranes, the size of the pores varies through the membrane, in general, increasing in size from one surface, the tight side, to the other surface of the membrane, the open side. In some versions of the invention microporous membrane may be a skinned membrane where the skinned side of the membrane is liquid permeable. Other types of asymmetry are known. For example, those in which the pore size goes through a minimum pore size at a position within the thickness of the membrane (hour glass shape). Asymmetric microporous membranes tend to have higher fluxes compared to symmetric microporous membranes of the same rated pore size and thickness. Also, asymmetric microporous membranes can be used with the larger pore side facing the fluid stream being filtered, creating a pre-filtration effect. Microporous membrane in versions of the invention can have pore structure chosen from the group consisting of symmetric, asymmetric, and hour glass. In some versions of the invention the pore structure of the microporous membrane is asymmetric. The nanofiber layer can overlie either the tight side or the open side of an asymmetric membrane. In some versions of the invention with an asymmetric membrane, the side of the microporous membrane with the largest pore size, the open side, faces or is in contact with an overlying nanofiber layer. In other versions of the invention the pore structure of the microporous membrane is asymmetric and the side of the microporous membrane with the smallest pore size, the tight side, faces or is in contact with an overlying nanofiber layer. In some versions of the invention the pore structure of the microporous membrane is asymmetric and can have a side with smallest pores with a size rating of from about 0.001 microns to about 0.01 microns (size rating determined by bubble point measurement in 3M™ HFE-7200 where the bubble point measured ranges from 75 to 150 psi), and the side of the microporous membrane with larger pores, the open side, faces or is in contact with an overlying nanofiber layer In some versions of the invention the microporous membrane can be a thermoplastic like PES, poly (tetrafluoroethylene-co-perfluoroalkylvinyl ether), (PFA), wherein alkyl is propyl, methyl or mixtures thereof, a polyamide, nylon 6, or a polyolefin; in other versions the membrane can be a fluoropolymer or perfluoropolymer like PTFE. In some versions of the invention the microporous membrane is ultra high molecular weight polyethylene. Ultra high molecular weight polyethylene is a version of thermoplastic polyethylene that has extremely long chains, with molecular weight numbering in the millions, for example 1 million or more, usually between 2 and 6 million. In some versions of the invention the microporous membrane comprises or consists of UPE.

The microporous membrane can have a mean IPA bubble point, an equivalent bubble point using another solvent and compensating for surface tension such as HFE-7200 from 3M™, greater than about 20 psig, in some case greater than 30 psig, and in still other cases greater than about 50 psig. In some versions the microporous membrane can have a mean IPA bubble point, or an equivalent bubble point using another solvent and compensating for surface tension such as HFE-7200 from 3M™, of from 20 psig to 150 psig.

In versions of the invention the microporous membrane has a mean bubble point in the liquid HFE-7200 from 3M™, of from 75 psi to 90 psi, in some cases an average bubble point of about 85 psi (586,054 Pa). In some versions of the invention the microporous membrane has a mean bubble point in the liquid HFE-7200 from 3M™, of from 95 psi to 110 psi, in some cases an average bubble point of about 100 psi (689,476 Pa). In some versions of the invention the microporous membrane has a mean bubble point in the liquid HFE-7200 from 3M™, of from 115 psi to 125 psi, in some cases an bubble point average of about 120 psi (827,371 Pa). In still other versions of the invention the asymmetric membrane has a mean bubble point in the liquid HFE-7200 from 3M™, of from 140 psi to 160 psi. The microporous membrane can be symmetric or an asymmetric microporous membrane.

In some versions of the invention the microporous membrane can be an asymmetric UPE membrane made by Entegris, Inc., referred to as a 10 nanometer asymmetric rated membrane that has a mean bubble point in the liquid HFE-7200 from 3M™, of from 75 psi to 90 psi, in some cases an average bubble point of about 85 psi (586,054 Pa). In some versions of the invention the microporous membrane can be an asymmetric UPE membrane made by Entegris, Inc., referred to as a 5 nanometer asymmetric rated membrane that has a mean bubble point in the liquid HFE-7200 from 3M™, of from 95 psi to 110 psi, in some cases an average bubble point of about 100 psi (689,476 Pa). In some versions of the invention the microporous membrane can be an asymmetric UPE membrane made by Entegris, Inc., referred to as a 3 nanometer rated asymmetric membrane that has a mean bubble point in the liquid HFE-7200 from 3M™, of from 115 psi to 125 psi, in some cases an bubble point average of about 120 psi (827,371 Pa).

In some versions of the invention the microporous membrane is further characterized by an IPA Flow time in a range of 350 seconds to 6500 seconds, in some cases from 500 seconds to 6500 seconds for 500 milliliters of IPA at a pressure of 0.10 MPa and temperature of 21° C. The IPA flow time for the asymmetric 0.005 micron (5 nm) UPE membrane with a mean bubble point in the liquid HFE-7200 from 3M™ of from 75 psi to 90 psi can range from 5000 seconds to 7000 seconds for 500 ml IPA at 0.1 MPa pressure at 21° C.

Without wishing to be bound by theory, the nanofibers in the nanofiber layer can cover a portion of the pores of the microporous membrane of the filter member in versions of the invention in such as way as to effectively reduce the pore size of the microporous membrane and improve particle retention with little or no increase in pressure drop compared to the microporous membrane alone.

Various surfactants can be used for testing the sieving properties of filter members and microporous membranes in versions of the invention. In some versions of the invention the surfactant is sodium dodecyl sulfate (SDS) or Triton X-100 (Triton X-100 ($C_{14}H_{22}O(C_2H_4O)_n$ which is a non-ionic surfactant which has a hydrophilic polyethylene oxide group (on average it has 9.5 ethylene oxide units) and a hydrocarbon lipophilic or hydrophobic group. The hydrocarbon group is a 4-(1,1,3,3-tetramethylbutyl)-phenyl group). The amount of surfactant used can be chosen to be above the critical micelle concentration (CMC). A surfactant concentration above the CMC can be measured using a surface tensiometer to monitor the surface tension of the fluid. In some versions of the invention the surfactant ranges from 0.1% (w/w) to 0.3% (w/w) which provides sieving or essentially sieving conditions. The use of a surfactant minimizes non-sieving effects of the microporous membrane, nanofiber layers, and optional support materials and provides sieving or essentially sieving conditions for the particle retention tests. It is expected that under these sieving conditions (or essentially sieving conditions) that the particle retention of the filter member or components like the microporous membrane, can be correlated with the particle retention properties of the filter member in organic liquids, compositions like photoresist and antireflective coatings containing organic liquids, and other similar liquids where filtration is dominated by the sieving filtration properties of the filter member or microporous membrane.

In some versions of the invention the filter member liquid pressure drop is measured using a liquid feed solution that contains 0.1% (w/w) Triton X-100 in water at a flow rate of 30 milliliters/minute at room temperature. In versions of the invention the pressure drop of the filter member measured with a liquid feed solution is less than the pressure drop of the microporous membrane measured with the liquid feed solution. In some versions of the invention the pressure drop of the filter member is 0 psi to 2 psi less, or 0% to 15% less, than the pressure drop of the microporous membrane measured with the liquid feed solution. In some versions of the invention the pressure drop or flow time of the filter member is about 0% to 15% less, in other versions 0% less to 10% less, and in still other versions 0% less to 5% less, than the pressure drop or flow time of the microporous membrane when measured under the same conditions of temperature, pressure and liquid feed solution composition.

IPA flow time is the time to flow 500 milliliters of isopropyl alcohol, at a temperature of 21° C. and pressure of 97,900 Pa (about 0.1 MPa, or about 14.2 psid), through a 47 millimeter disk of the microporous membrane alone or a filter member (for example, microporous membrane, nanofiber layer, and optional support) with an area of 12.5 cm². The bubble point refers to a mean IPA bubble point using an air flow porisometer. In some cases microporous membrane bubble points refer to a mean bubble point measured in HFE-7200 (available from 3M™, St. Paul, Minn.). HFE-7200 bubble points can be converted into IPA bubble point values by multiplying the HFE 7200 measured bubble point by 1.5, or about 1.5. 3M™ HFE-7200 is ethoxy-nonafluorobutane and has a reported surface tension of 13.6 mN/m at 25° C.

Nanometer sized fluorescent polystyrene latex (PSL) beads can be used to characterize the filter members and microporous membranes of the invention utilizing the methods and materials disclosed in "Sub-30 nm Particle Retention Test by Fluorescence Spectroscopy", Yaowu, Xiao, et al, Semicon China, Mar. 19-20, 2009, Shanghi, China, the contents of which are incorporated herein by reference in their entirety (see also U.S. Provisional Patent No. 61/168,776, incorporated herein by reference in its entirety). In some versions of the invention the fluorescent nanoparticles are G25 particles which are distributed by Duke Scientific who lists the nominal diameter of the particles at 25 nanometers. However particles in the range of 20 nanometers to 30 nanometers, in some cases 21 nanometers to 24 nanometers, can be used. The percent fluorescent particle monolayer coverage used to evaluate the filter members can be between 1% and 30% although other percent coverage lower and high can also be used.

In some versions of the invention the filter member has a liquid particle retention for 25 nanometer fluorescent polystyrene latex beads from a test liquid with 0.3 wt % sodium dodecylsulfate (SDS) surfactant at 10% monolayer coverage to 30% monolayer coverage, that is substantially the same or is greater than the liquid particle retention of the microporous membrane alone for the 25 nanometer fluorescent polystyrene latex beads under the same test conditions. In some versions of the invention the microporous membrane comprises ultra high molecular weight polyethylene.

In some versions of the invention the liquid can be water or an aqueous solution optionally containing a surfactant, optionally in a pH range of about pH 6 to about pH 7 and in some cases a pH of about pH 8 or even pH 8.5. In some versions the liquid can be an organic solvent or a liquid composition such as a photoresist or a developer.

Filter cartridges or filter devices can be made that comprise a filter member in versions of the invention that is bonded or mounted in a housing. For example, a filter cartridge can comprise an optional cylindrical core, an optional drainage layer around the core, a microporous membrane overlying the drainage layer, a first nanofiber layer atop the microporous membrane that has a first porous support, optional additional nanofiber layers each with a porous support that overlie the first nanofiber and first support layer, an optional outer drainage layer surrounding the outer nanofiber and support layer, an optional cage that supports and surrounds the microporous membrane and nanofiber layers; these components can be inserted into a housing and bonded to endcaps that can have various inlet and outlets. The microporous membrane and nanofiber layer can be wrapped about a core or may be pleated along with optional support and drainage layers to form a pleat pack. Non-limiting examples of filter cartridges that include the filter member include those described in Example 3 (Optimizer® style cartridge, Entegris, Inc., Billerica, Mass.) and Example 5 (Impact® style cartridge, Entegris, Inc. Billerica, Mass.).

Fiber Diameter in the nanofiber layers or sublayers can be determined by SEM analysis and measurement of random samples of nanofibers in the layers of a filter member. The average fiber diameter from these measurements can be used to calculate an average fiber diameter for each nanofiber layer.

The term "span on" is used to describe a process whereby a web or nonwoven support is passed under the spinning head/die of an electrospinning apparatus and where nanofiber fiber is spun on the web or support.

In some versions of the invention the nanofiber layer is not bonded to the nonwoven support and may be peeled off the support nonwoven. Basis weight of the porous or nonwoven support can be determined by measuring the mass of the web (certain area), measured in grams, and dividing this by the area of the support, measured in square meters. For the nanofiber layer, the basis weight can be determined by peeling an area of the nanofiber layer off the support and measuring its mass in grams and then dividing by the area of the peeled nanofiber sample.

In some versions of the invention with more than one nanofiber and support layer, the additional support layers overlying the subsequent nanofiber layers can have a different mass, composition, porosity, weight, or any combination of these. For example, in the case of a filter member that has a first nanofiber with a first support layer and an overlying second nanofiber layer with a second support layer, a lower weight material may be used for the second support layer to keep the thickness of the second support layer low and allow the same number of pleats in the filter. In some versions of the invention, the additional layers of nanofiber can have a different composition, fiber diameter, or weight basis compared the first nanofiber layer or other nanofiber layers.

Example 1

Particle retention and pressure drop tests were performed on a 5 nanometer rated asymmetric UPE microporous membrane alone; a 5 nanometer rated asymmetric UPE microporous membrane layered with an approximately 0.2 micron rated nylon nanofiber layer; and a 5 nm rated asymmetric UPE microporous membrane with an approximately 0.2 micron rated nylon microporous membrane. The 0.2 micron rated nanofiber layer in this example is based on the IPA bubble point of the nanofiber layer which was between about 21 psi and about 25 psi; the IPA bubble point for a 0.25 micron rated UPE membrane in IPA under similar conditions was between 20 and 29 psi. The 5 nm rated asymmetric UPE microporous membrane was characterized by a bubble point measurement in 3M™ HFE-7200, the bubble point was between 95 psi and 110 psi.

Under the test conditions (25 nanometer negatively charged fluorescent PSL particles in water, with the filter member or microporous membrane and feed solution treated with 0.1% Triton X-100), the filter member samples with the 0.2 micron rated nylon nanofiber on 5 nm rated asymmetric UPE, and the sample of 0.2 micron-rated nylon membrane on 5 nm rated asymmetric UPE showed significantly better retention of the 25 nanometer fluorescent particles than the 5 nanometer asymmetric microporous UPE membrane alone.

The filter member with the 0.2 micron rated nylon nanofiber and 5 nanometer rated asymmetric UPE microporous membrane had a lower pressure drop (13 psi) than the 5 nanometer asymmetric UPE microporous membrane with the 0.2 micron rated nylon membrane (17 psi) and (also surprisingly) lower pressure drop than the UPE membrane (15 psi) by itself;

Without wishing to be bound by theory, the retention improvement of the 0.2 micron rated nylon nanofiber with 5 nanometer rated asymmetric UPE microporous membrane and the retention improvement for the 5 nanometer rated asymmetric UPE microporous membrane with the 0.2 micron rated nylon membrane over the UPE membrane alone is possibly due to sieving as well as additional non-sieving effects of the nylon nanofiber or nylon membrane. The presence of surfactant in this example however is expected to minimize adsorption and non-sieving effects.

Asymmetric UPE membrane could be made by the methods and materials disclosed by Yen and Patel in (WO/2006/069307) titled MULTILAYER POROUS MEMBRANE AND PROCESS OF MANUFACTURE the disclosure of which is incorporated herein by reference in its entirety.

In this experiment, 90 millimeter (mm) disk membrane coupons were challenged with 5 ppb fluorescent particles (Duke Scientific G25) suspended in a surfactant solution (0.1% Triton X-100 in DIW).

For the tests, a 5 nanometer-rated asymmetric UPE membrane was placed (open layer up) on the holder, and either a 0.2 micro-rated nylon nanofiber or 0.2 micron-rated nylon membrane was placed on top of it. All samples were wetted with IPA solvent and tested for integrity by applying 15 pounds per square inch (psi) or (103421 Pa) of pressure upstream. The coupon was then washed with DI water for 10 minutes. After DI washing, membranes were treated with surfactant solution (0.1% (w/w) Triton X-100) for 5 minutes. Approximately 100 milliliters of the feed solution was flushed through the vent of the coupon holder in order to remove the volume of water remaining in the coupon holder, which would cause dilution at the very beginning of the test, and lead to ""false" retention. The feed sample was then collected off of the vent prior to starting the retention test. The retention test was conducted with a consistent flow rate of about 30 milliliters/min. The measured pressure drop was approximately 13 pounds per square inch (psi) (89632 Pa) for the 5 nanometer rated asymmetric UPE microporous membrane with the nylon nanofiber layer; the measured pressure drop for the same flow rate was approximately 17 psi (117211 Pa) for the 5 nanometer rated asymmetric UPE microporous membrane with the 0.2 micron rated nylon membrane; the measured pressure drop was approximately 15 psi (103421 Pa) for the 5 nanometer rated asymmetric UPE membrane alone. A total of 5 filtrate samples were collected in test tubes while an analytical balance was used to measure loading values from 1% to 5% monolayer on the membrane.

Fluorescence spectroscopy was carried out on Hitachi F-7000 fluorescence spectrometer. The excitation/emission wavelengths of the G25 particles were selected as 468/506 nm and a cuton optical filter was installed to minimize interfering excited light appearing in the emission spectra.

Fluorescence spectra were taken of the filtrate solutions collected during testing of: the sample with 5 nanometer asymmetric UPE microporous membrane that had 0.2 micron nylon nanofiber on the 5 nanometer UPE microporous membrane; the sample with 0.2 micron nylon microporous membrane on 5 nanometer rated asymmetric UPE microporous membrane; the sample with of the 5 nanometer rated asymmetric UPE microporous membrane alone. The results of the retention tests are summarized in Table 1.

TABLE 1

Percent retention of G25 particles for a sample of 5 nm rated asymmetric UPE microporous membrane with nylon nanofiber, a sample of 5 nm rated asymmetric UPE microporous membrane with nylon microprous membrane, and a sample of 5 nm rated asymmetric UPE microporous membrane alone.

| Monolayer Coverage | 5 nm rated asymmetric UPE membrane with nylon nanofiber | 5 nm rated asymmetric UPE membrane with nylon 0.2 micropouous membrane | 5 nm rated asymmetric UPE |
|---|---|---|---|
| 1% | 88 | 93 | 77 |
| 5% | 75 | 89 | 25 |

The approximate retention of nylon nanofiber layer is about 77% for 1% monolayer coverage and 69% for 5% monolayer coverage. These results varied due to practical difficulties in controlling flow rate to achieve a pressure drop as small as 0.1 psi for the nanofiber layer.

These results were repeatable and show that the 5 nm rated asymmetric UPE microporous membrane with nylon nanofiber has better particle retention and lower pressure drop (about 13 percent lower) than the asymmetric microporous UPE membrane alone. The combination of 5 nm rated asymmetric UPE membrane with 0.2 micron microporous nylon membrane 0.2 had better retention but higher pressure drop (about 13 percent higher) than either the UPE microporous membrane alone or for the 5 nm rated asymmetric UPE microporous membrane with nylon nanofiber.

Example 2

This example compares 25 nanometer fluorescent particle retention in the presence of a surfactant on filter member coupon samples at 10% monolayer (ML) particle coverage, 20% monolayer particle coverage, 30% ML particle coverage as well as bubble point and isopropyl alcohol flow time for a polyamide nanofiber layer, various size rated UPE microporous membranes, and the combination of polyamide nanofiber layer and microporous UPE membranes.

Figure 4:
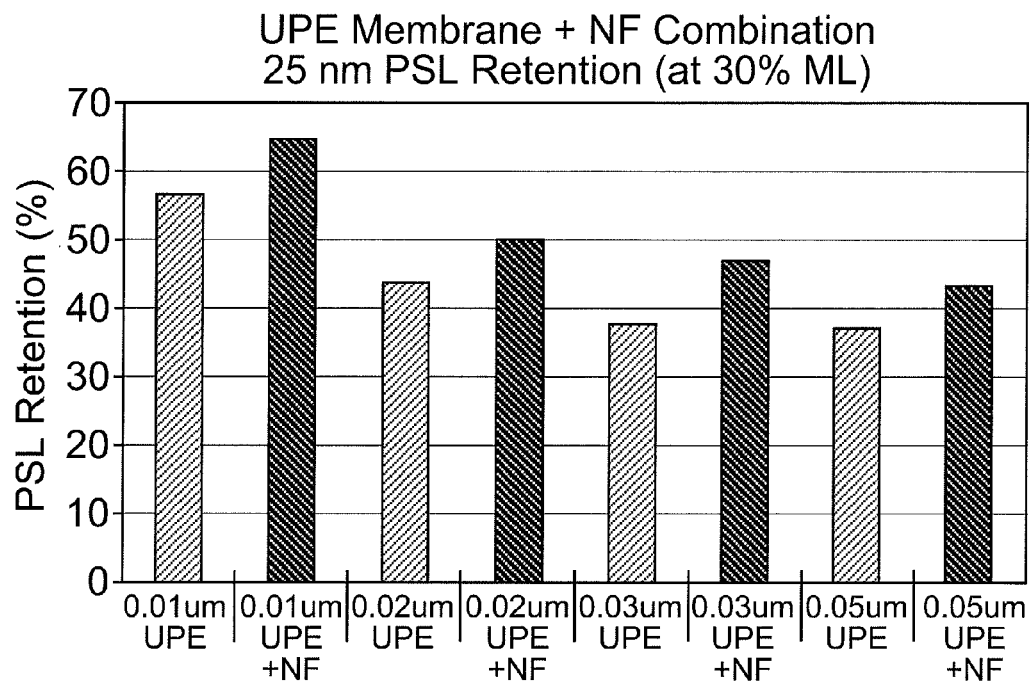
FIG. 4 is a graph showing the 30% monolayer retention values for the filter member of Example 2 compared with the corresponding microporous membrane alone for each size rating (membrane size rating determined by HFE-7200 bubble point). The bar graph shows that the PSL retention percent is lower for the microporous membrane alone than for the filter member that includes the nanofiber layer and microporous membrane.
Figure 5:
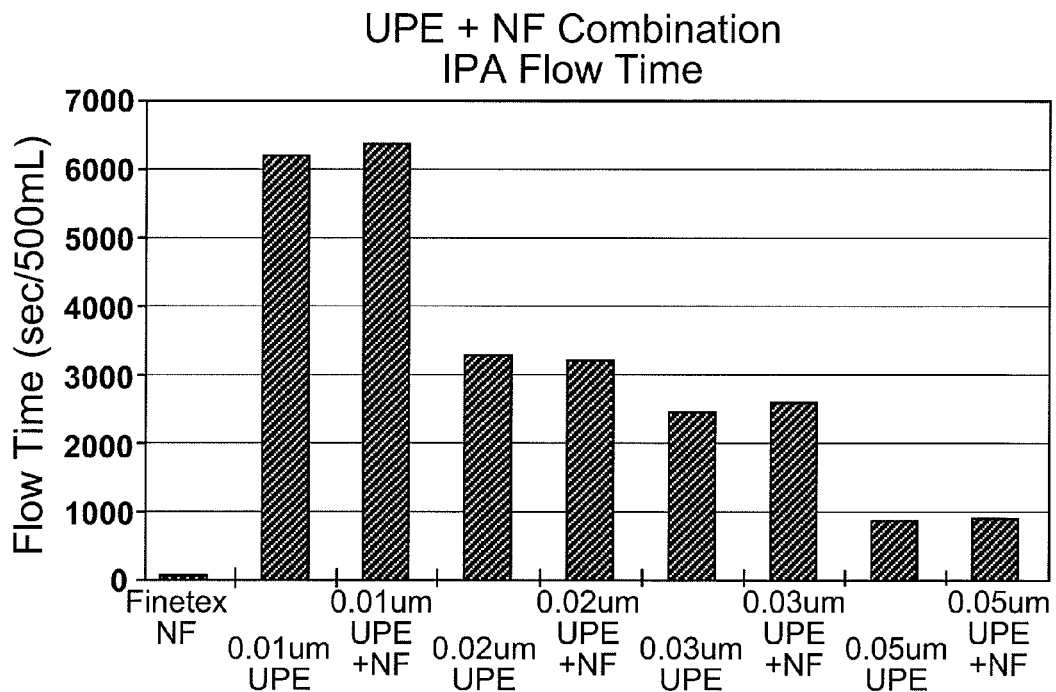
FIG. 5 is a graph of IPA flow time for the nanofiber layer, the flow time for the microporous membrane alone, and the flow time for the composite membranes or filter member of Example 2 for each size rating as determined by HFE-7200 bubble point.
Figure 6:
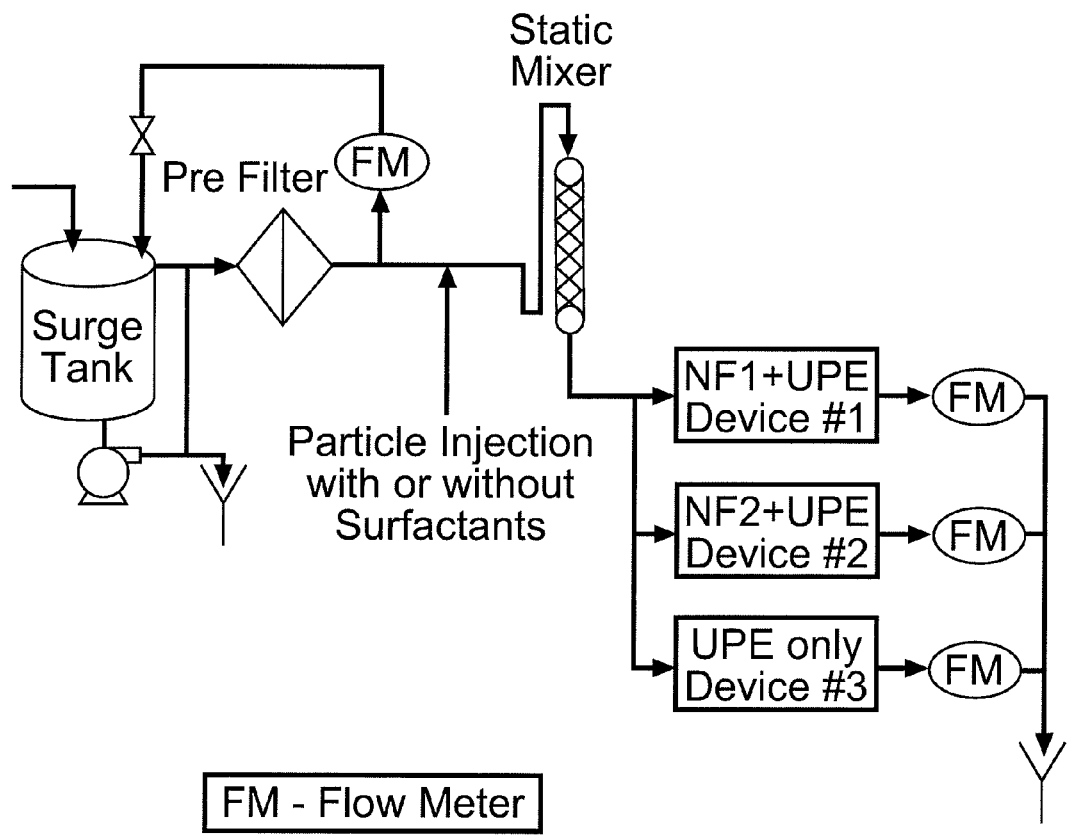
FIG. 6 is an illustration of a particle retention test stand used in the Examples.

Microporous UPE membrane coupons samples for particle retention testing alone or that were combined with a polyamide nanofiber layer to make filter member coupons. The microporous UPE membranes were obtained from Entegris (Chaska, Minn.). The UPE microporous membrane samples evaluated in this example include 0.01 micron rated (bubble point 70 psi to 83 psi in 3M™ HFE-7200), 0.02 micron rated (bubble point 55 psi to 64 psi in 3M™ HFE-7200), 0.03 micron rated (bubble point 68 psi to 83 psi in IPA), and 0.05 micron rated (bubble point 50 psi to 63 psi in IPA) UPE membrane. The nanofiber layer was prepared by Finetex and was a Polyamide. Microporous membrane coupons samples were 90 millimeter disks. Approximately 25 nanometer fluorescent PSL beads available from Duke Scientific as product number "G25" were used. For particle retention testing, 10% ML coverage was achieved by challenging the membrane sample 3 times with a solution that contained 0.27 ppm PSL bead in 0.3% sodium dodecyl sulfate (SDS) surfactant and total volume of 30 mL. The use of a surfactant minimizes non-sieving effects of the nylon materials and provides sieving or essentially sieving conditions for the particle retention test. The test stand is illustrated in FIG. 6. Test pressures were 0.04 MPa/0.10 MPa (0.01 micron UPE). The results of these tests are shown in FIG. 3, FIG. 4, and FIG. 5.

The results of these tests show that compared with the UPE 0.01 micron microporous membrane, the combination of 0.01 micron UPE with the polyamide nanofiber results in a 2.2% increase in flow loss and in the presence of surfactant in the test liquid results in a 14% increase in retention at 30% ML, an 8.3% increase in retention at 20% ML, and a 2.2% increase in retention at 10% ML.

The results of these tests show that compared with the UPE 0.02 micron microporous membrane, the combination of 0.02 micron UPE with the polyamide nanofiber results in a 1.7% decrease in flow loss and in the presence of surfactant in the test liquid results in a 13.6% increase in retention at 30% ML, a 3.6% increase in retention at 20% ML, and a 1.4% decrease in retention at 10% ML.

Figure 3:
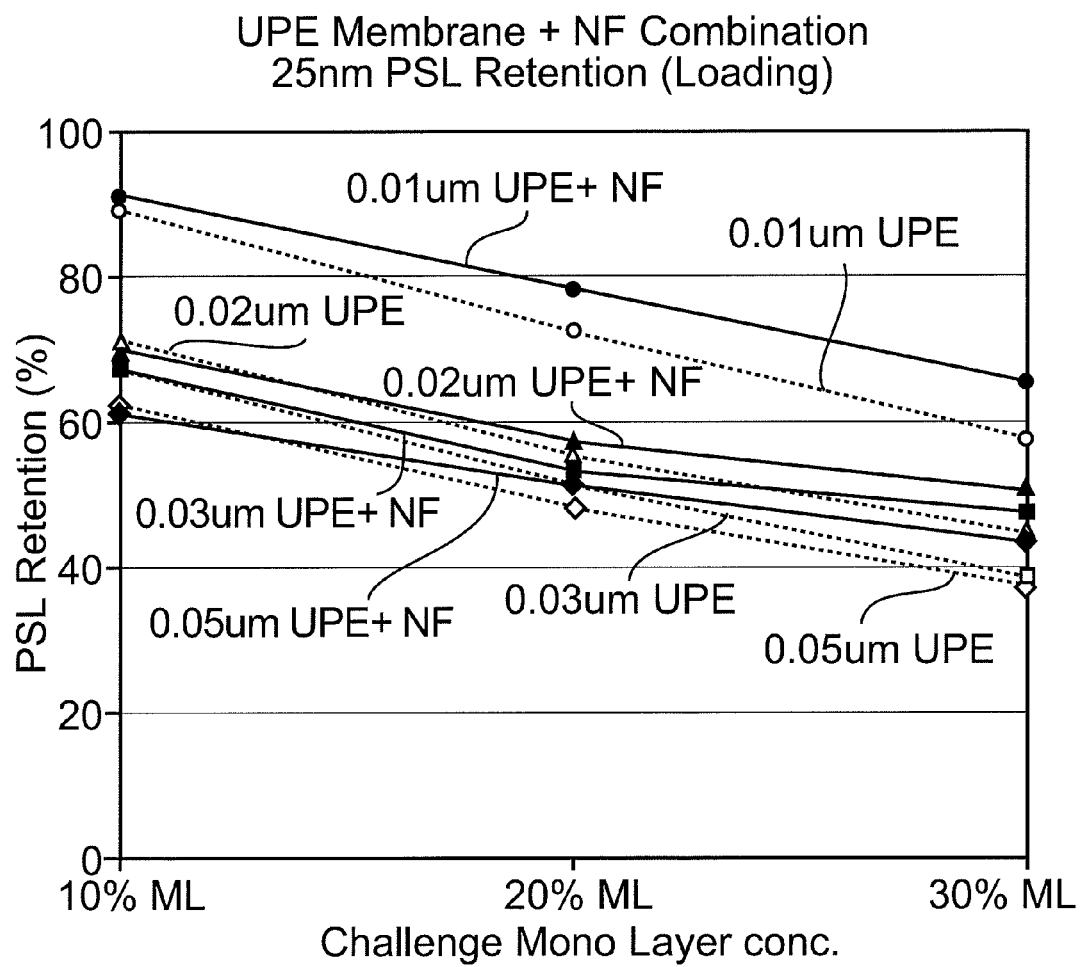
FIG. 3 is a graph showing the polystyrene latex (PSL) bead retention for the microporous membrane and the filter members of Example 2 for each rated membrane (the membrane rating is determined by HFE-7200 bubble point) at various monolayer coverage percentages.

The PSL retention for the composite membranes or filter members is shown in FIG. 3. The 30% monolayer retention for the filter members is shown in FIG. 4, and the IPA flow time for the filter members is shown in FIG. 5.

The results of the IPA flow time tests show that flow time difference between microporous membrane alone and the combination of microporous membrane and nanofiber layer varies by about ±4%. For particle retention at 30% ML coverage, the retention for the combination of microporous membrane and nanofiber is increased over the UPE membrane alone by 14% to 24%. As PSL particle coverage on the membrane increases from 10% ML to 30% ML gradually and linearly, the Retention performance of UPE micropo-

TABLE 2

Example 2 test results on coupon samples

| Sample | Percent retention at 10% ML coverage of 25 nm PSL fluorescent particles | Percent retention at 20% ML coverage of 25 nm PSL fluorescent particles | Percent retention at 30% ML coverage of 25 nm PSL fluorescent particles | HFE-7200 bubble point Initial (psi) | HFE-7200 bubble point Mean (psi) | IPA flow time (seconds/ 500 ml at 0.1 MPa) |
|---|---|---|---|---|---|---|
| Polyamide Nanofiber (NF) and support | 32 | 10 | 6 | — | — | 56 |
| 0.01 micron rated UPE | 89 | 72 | 57 | 94.5 | 101.5 | 6037 |
| 0.01 micron rated UPE + NF | 91 | 78 | 65 | 95.9 | 103.0 | 6172 |
| 0.02 micron rated UPE | 71 | 55 | 44 | 63.4 | 71.8 | 3153 |
| 0.02 micron rated UPE + NF | 70 | 57 | 50 | 65.5 | 73.7 | 3099 |
| 0.03 micron rated UPE | 67 | 51 | 38 | 52.3 | 61.7 | 2361 |
| 0.03 micron rated UPE + NF | 67 | 53 | 47 | 51.9 | 59.8 | 2458 |
| 0.05 micron rated UP | 62 | 48 | 37 | 38.4 | 52.7 | 830 |
| 0.05 micron rated UPE + NF | 61 | 51 | 43 | 38.4 | 47.8 | 852 |

The results of these tests show that compared with the UPE 0.03 micron microporous membrane, the combination of 0.03 micron UPE with the polyamide nanofiber results in a 4.1% increase in flow loss and in the presence of surfactant in the test liquid results in a 23.7% increase in retention at 30% ML, a 3.9% increase in retention at 20% ML, and a 0% increase in retention at 10% ML.

The results of these tests show that compared with the UPE 0.05 micron microporous membrane, the combination of 0.05 micron UPE with the polyamide nanofiber results in a 2.7% increase in flow loss and in the presence of surfactant in the test liquid results in a 16.2% increase in retention at 30% ML, a 6.2% increase in retention at 20% ML, and a 1.6% decrease in retention at 10% ML.

As shown by the results in Table 2, the nanofiber layer provides an increasing portion of overall particle retention compared to the microporous membrane in the presence of a surfactant in the test liquid with increasing test particle monolayer percent coverage of the filter member. The results of these tests show as particle loading on the sample coupons with a nanofiber layer increases, i.e. 10% ML, 20% ML, etc., the contribution to the overall loading capacity of the filter member becomes larger.

rous membrane alone decreases. On the contrary, the retention by the combination of (UPE+Nanofiber) does not drop by as much.

The difference of retention performance between two samples (UPE and UPE+Nanofiber) enlarges with increasing monolayer coverage. This illustrates that the combination of nanofiber and microporous membrane has better retention over time than the UPE microporous membrane alone.

Example 3

This example measures the pressure drop, particle shed testing, and particle retention on the three 4 inch Optimizer® D sized filter cartridge devices that were made either with asymmetric microporous UPE membrane only or with a combination of nylon nanofiber on a nylon non-woven support with the same asymmetric microporous UPE membrane. Optimizer® D filters are made by Entegris, Chaska, Minn. The filter cartridge devices prepared for this example were evaluated by pressure drop testing, particle retention testing, and particle shed testing. One filter cartridge device (Optimizer® D Asy5 nm) was made with an Entegris 5 nanometer asymmetric UPE membrane, while the other two devices (Optimizer® D Asy5 nm SP) were made with 5 nm asymmetric UPE membrane and a layer of 0.2 um rated nylon nanofiber (abbreviated as NNF1+UPE or NNF2+ UPE).

Additional information for the filter cartridge devices is summarized in the Table 3.

TABLE 3

Summary of Example 3 cartridge device components.

| Label | NNF1 + UPE | NNF2 + UPE | UPE only |
|---|---|---|---|
| Sample Name | Optimizer ® D Asy5nm SP-1 | Optimizer ® D Asy5nm SP-1 | Optimizer ® D Asy5nm |
| Sample # | 2009-004-1-1 | 2009-004-1-2 | 2009-004-2-1 |
| 5 nm UPE membrane area | 1,570 cm² | 1,570 cm² | 1,570 cm² |
| Nylon Nanofiber PA6 | YES | YES | No |

The filter devices were made by applying nylon nanofiber from Finetex to a non-woven nylon support. The nanofiber layer was placed facing the open side of the 5 nanometer asymmetric UPE membrane and an additional polyethylene backing layer was provided. The combination including nylon non-woven, nylon nanofiber, 5 nanometer asymmetric UPE microporous membrane, and polyethylene backing were bonded with end caps to form prototype filter cartridge devices for testing. The asymmetric 5 nm microporous membrane was obtain from Entegris, Inc., and is characterized by a bubble point in 3M™ HFE-7200 of between 95 psi and 110 psi.

The nanofiber layer had fibers of between about 60 nanometers and about 150 nanometers in diameter, the nanofiber layer had a thickness of about 5 microns, and the nanofiber layer had a rated size of 0.2 microns as determined by IPA bubble point.

The filter device with only 5 nanometer asymmetric UPE microporous membrane had a higher pressure drop than that of the devices made with nylon nanofiber and asymmetric 5 nanometer UPE microporous membrane.

G25 particles used were distributed by Duke Scientific (Thermo Fisher Scientific Inc., Waltham, Mass.), who lists the nominal diameters of the particles at 25 nanometers, however lab measurement show particle diameters between about 21 nanometers and 24 nanometers based on a dynamic light scattering instrument, Model BI-2005M from Brookhaven Instrument Corporation.

Prior to testing, the three filters were first wet with isopropyl alcohol (IPA) and then flushed with DI water for approximately 30 minutes.

The three filters devices in this example were tested together in a single bypass test stand as illustrated in FIG. 6. A flow rate of 1 liter per minute was used during particle challenge in deionized (DI) water. The filters were then challenged with G25 fluorescent particles in DI water as well as with the addition of surfactant (TritonX-100) to eliminate non-sieving effects. The surfactant was injected upstream of the filter using a pressure vessel at a constant flow rate targeting a 0.1% surfactant concentration, which is above the critical micelle concentration (CMC). To ensure that the surfactant concentration remained above the CMC, a surface tensiometer was used to monitor the surface tension of the fluid; a value of 30 dynes correlates to a 0.1% concentration The addition of the surfactant reduced the achievable flow rate to approximately 0.8 LPM, and this flow rate was used to test all filters for retention with surfactants. The G25 fluorescent particles were injected at a known concentration upstream of the filter for 45 minutes. Samples were collected both upstream and downstream of the filter every 5 minutes and measured by an Hitachi F-7000 FL fluorescent spectrometer.

All devices are challenged simultaneously with the G25 fluorescent particles at fixed flow rate; upstream and downstream solutions from each devices were measured for fluorescent signals.

All test filter devices prepared for this example showed similar particle shed performance under static and pulse shedding, indicating that the nanofiber fibers were not released or shed into the process liquid stream. All of the devices showed good and comparable retention of G25 fluorescent particles in DI water at lower, pH 6, and neutral, pH 7, conditions. It was observed that the retention of G25 fluorescence particles is reduced for all of the devices when tested at pH 8, indicating that the non-sieving effects are reduced at higher pH condition.

The G25 particle retention for all filters decreases with the addition of surfactant into the upstream solution which reduced non-sieving retention effects (retention is primarily by sieving); suggesting that the retention of 25 nm size particles in DI water was largely due to non-sieving effect. The addition of surfactant allows for the differentiation of particle retention between the filter with only an asymmetric 5 nanometer UPE microporous membrane and the devices with both an asymmetric 5 nanometer UPE microporous membrane and nylon nanofiber layer. At lower pH 6 and neutral pH 7 conditions, it is consistently observed that the particle retention of the device with the asymmetric 5 nanometer UPE microporous membrane and nylon nanofiber membrane is slightly better than the device with only the asymmetric 5 nanometer UPE microporous membrane. These results suggest that the non-sieving effects are higher for the devices with additional nylon nanofiber layer.

However, at higher pH 8, where the non-sieving effects are reduced, the differentiation of particle retention is not clear. Higher retention is observed for the devices with nylon nanofiber at the beginning, but the retention decreases at the end of the test. Without wishing to be bound by theory, the retention observed could be a result of the filters being used multiple times and plugged from previous tests. The inventors would expect to see greater differentiation of retention at different pH and surfactant conditions if each test was performed on a new filter.

Figure 7:
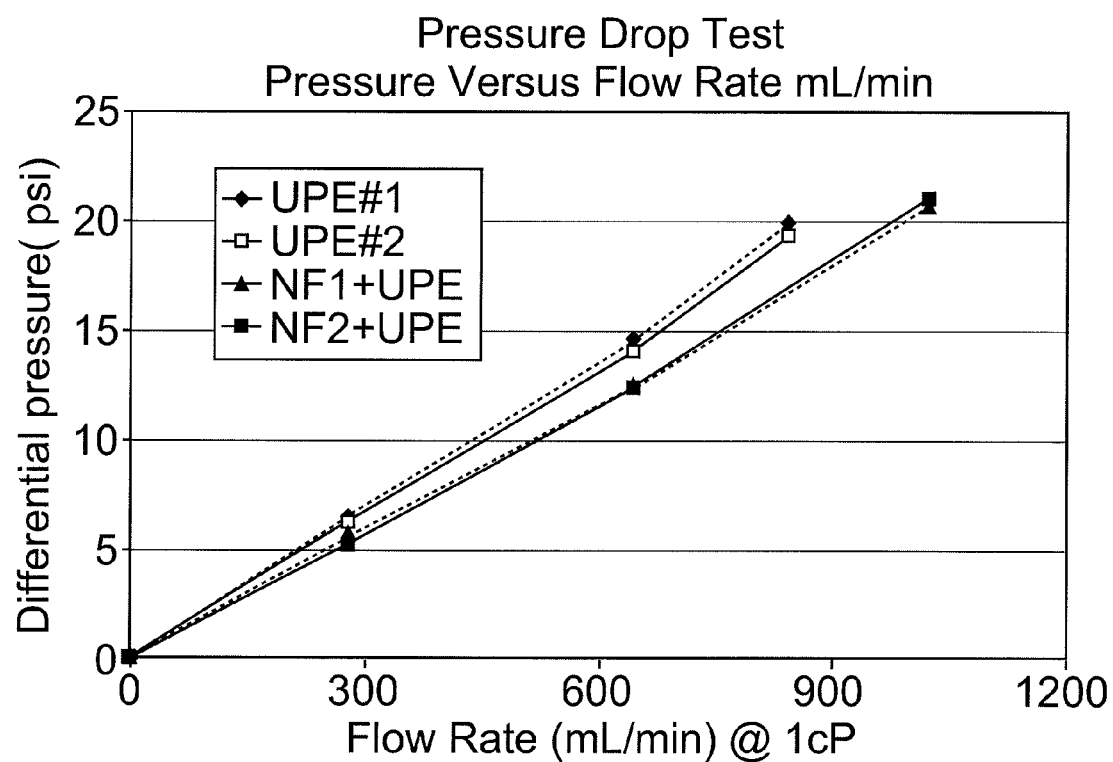
FIG. 7 is a graph showing the differential pressure in pounds per square inch (psi) versus flow rate in ml/min at 1 centipoise for the microporous membranes and the membrane composites or filter members in Example 3.

The pressure drop of the filters was measured by flowing DI water through each filter cartridge device at a series of flow rates and observing the pressure drop across the filter. The filter with only the UPE microporous membrane had a higher pressure drop than the filters with the 5 nm UPE membrane and the 0.2 micron rated nylon nanofiber layer. With reference to the graph in FIG. 7, at about 650 ml/min flow, the pressure drop for the filters with nanofiber and UPE microporous membrane are less, about 11% or more (i.e. 12%), than the pressure drop measured for the filter with UPE microporous membrane only.

Figure 8:
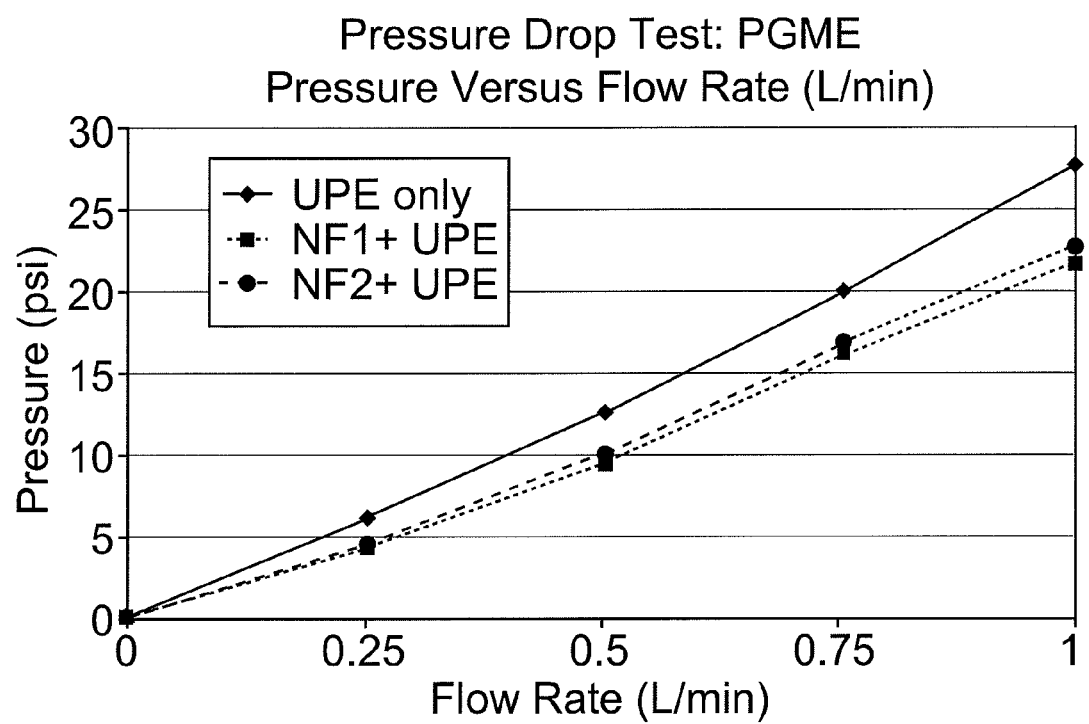
FIG. 8 is a graph showing the differential pressure in pounds per square inch (psi) versus flow rate in ml/min of flowing PGME; this pressure drop data is for the microporous membrane alone and for the filter members in Example 3.

In another set of tests the pressure drop of filters with nanofiber and UPE microporous membrane and a filter with only UPE microporous membrane were measured using an organic liquid like Propylene glycol monomethyl ether (PGME). The results illustrated in FIG. 8 show that the devices with nanofiber and UPE membrane also have lower pressure drop than the device with UPE membrane alone.

With reference to this graph for PGME, at about 0.5 liter/min flow rate, the pressure drop for filters with nanofiber and UPE are about 21%, or more (e.g. 22%), less than the pressure drop measured for the filter with UPE membrane only.

The three filter cartridge devices were tested for particle shedding performance by flowing DI water through the filters at 1 liter per minute and measuring the number of particles downstream of the filters using an optical particle counter (OPC). Each filter was tested at a constant pressure for at least one hour and the filters were challenged under pulsating conditions where the system pressure was spiked every 30 seconds for 1 hour.

Figure 9:
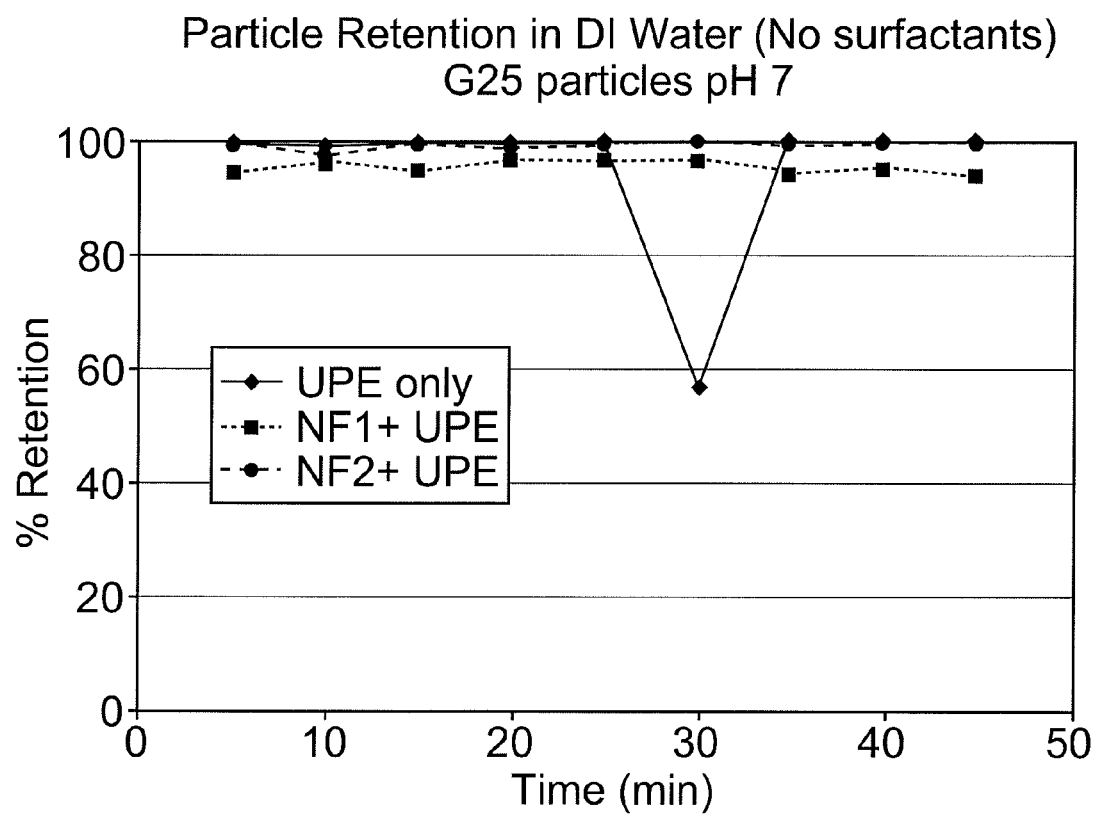
FIG. 9 is a graph of results from Example 3 showing percent G25 fluorescent particle retention versus time at pH 7 without surfactants for a UPE microporous membrane only, and two composite filter samples that include the UPE microporous membrane, a nylon nanofiber layer (abbreviated as NNF or NF in Example 3), and a non-woven nylon support
Figure 10:
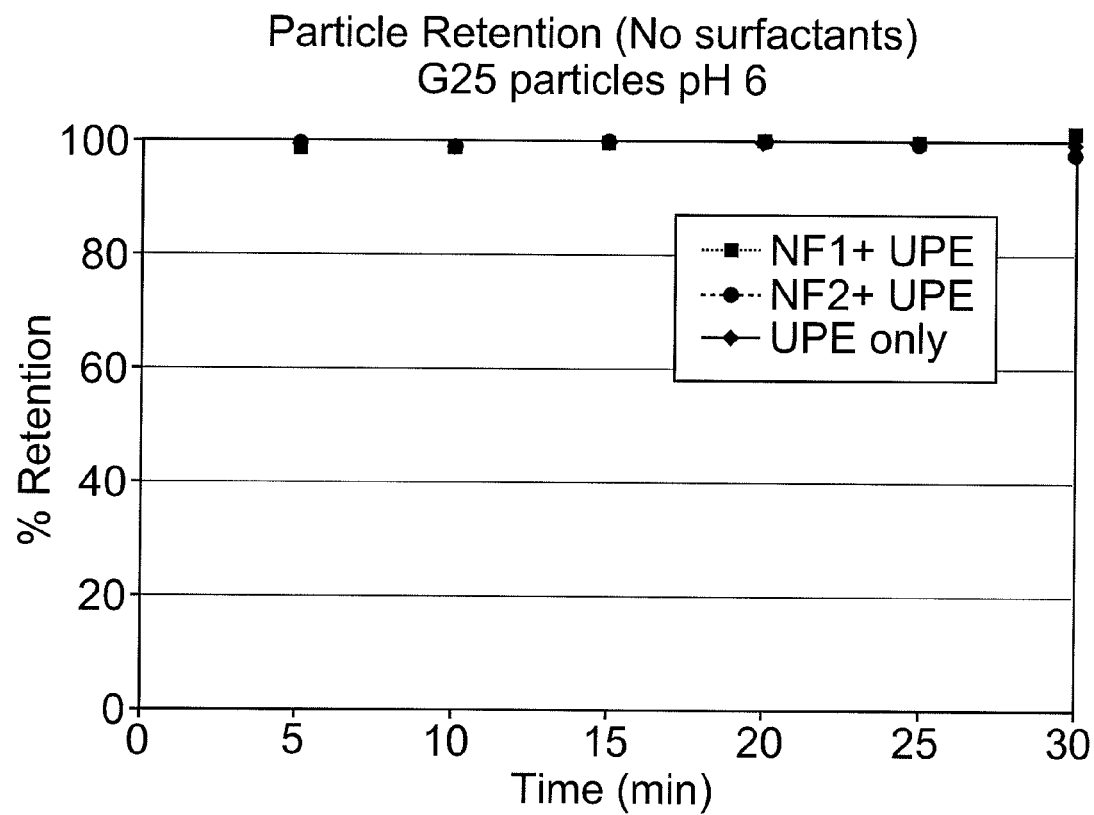
FIG. 10 is a graph of results from Example 3 showing percent G25 fluorescent particle retention versus time at pH 6 without surfactants for a UPE microporous membrane only, and two filter member samples that include the UPE microporous membrane, a nylon nanofiber layer (abbreviated as NNF or NF in Example 3), and a non-woven nylon support
Figure 11:
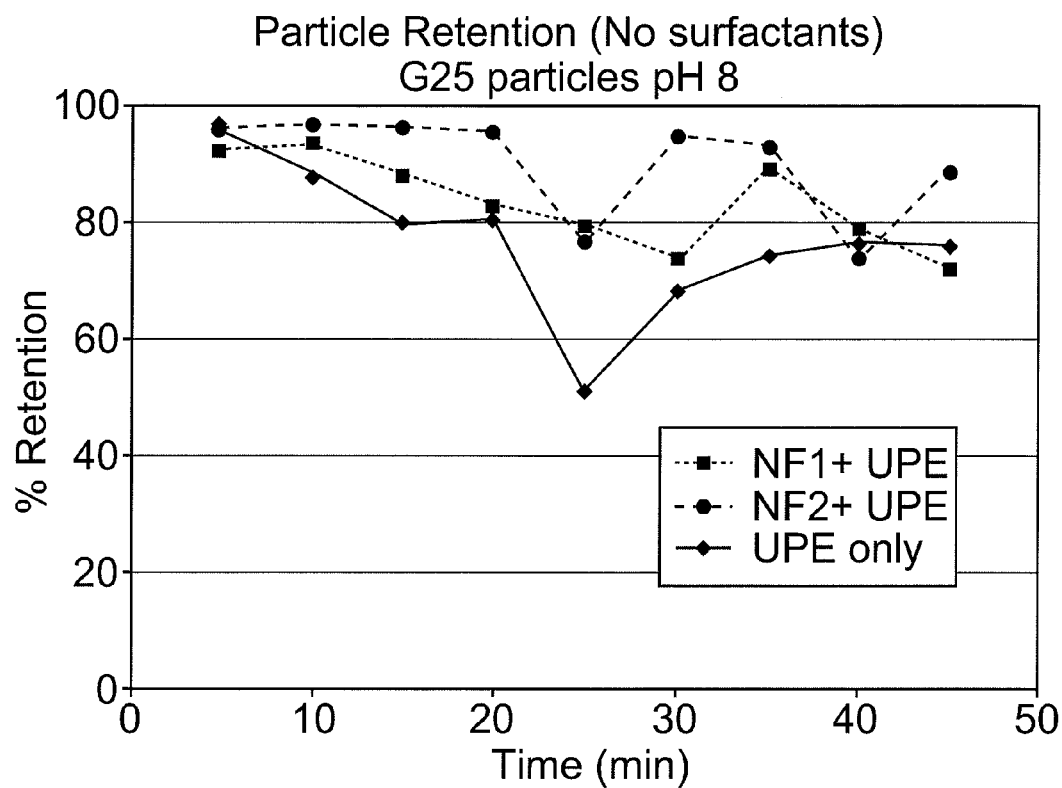
FIG. 11 is a graph of results from Example 3 showing percent G25 fluorescent particle retention versus time at pH 8 without surfactants for a UPE microporous membrane only, and two filter member samples that include a UPE microporous membrane, a nylon nanofiber layer (abbreviated as NNF or NF in Example 3), and a non-woven nylon support

The results in FIG. 9, FIG. 10, and FIG. 11 show that all three of the filters cartridge devices were comparable in their shedding and pulse shedding performance showing that the nanofibers do not add to particle shedding of the filters.

The filter cartridge devices were challenged with G25 fluorescent particles in DI water. The particles were injected upstream of the filter for 45 minutes and samples for particle analysis were collected every 5 minutes upstream and downstream of the filter. The samples were then measured with a fluorescence spectrometer. The results for the 45 minute duration of the particle injection show that both filters (NNF1+UPE, NNF2+UPE and UPE only) have very good and comparable particle retention at pH 6 (FIG. 10) and pH 7 (FIG. 9) with no surfactants. At pH 8 and no surfactants (FIG. 11), the retention of all the filters reduces, however the NNF1+UPE and NNF2+UPE filter members have higher retention compared with the UPE only filter, illustrating that even under these non-sieving conditions of higher pH condition, filter members of NNF1+UPE and NNF2+UPE have better sieving retention even with the relatively larger size rated nylon nanofiber layer. In FIG. 10, the points essentially are on top of each other, and for clarity trendlines are omitted.

The filters were tested again with G25 fluorescence particles but with the addition of surfactant to the process stream to eliminate non-sieving effects. Surfactant was injected at a constant rate to achieve 0.1% concentration at the filter; this concentration was above the CMC.

Figure 12:
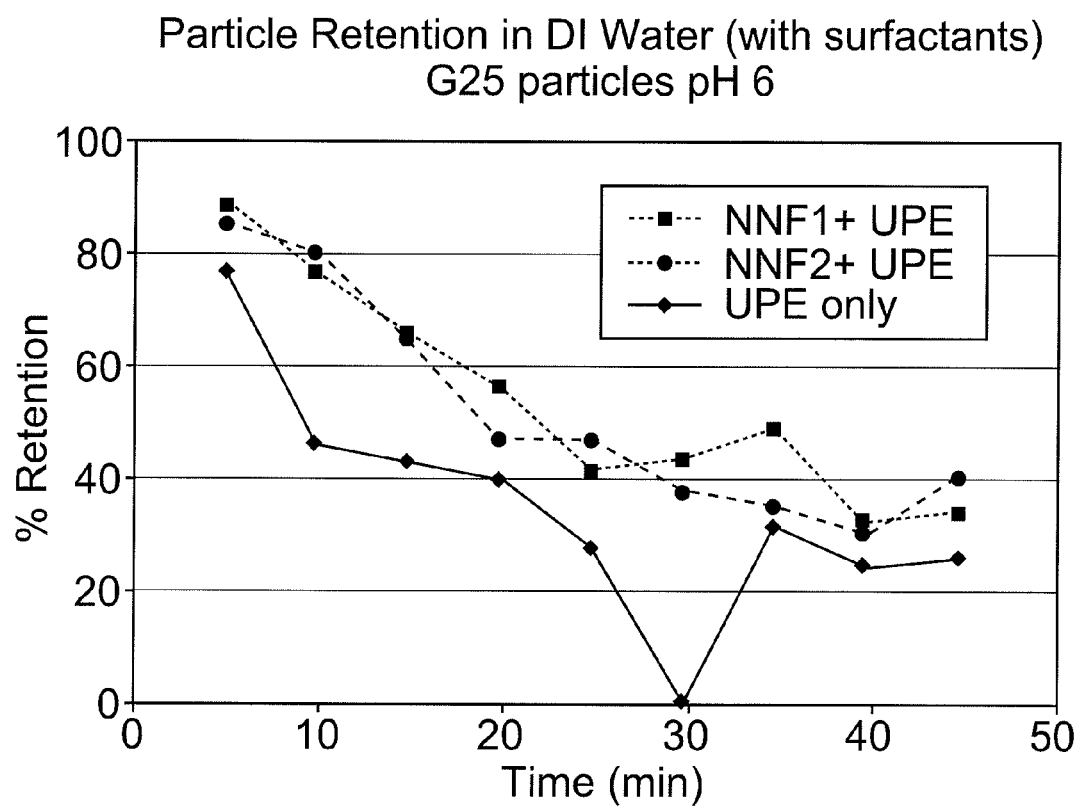
FIG. 12 is a graph of results from Example 3 showing percent G25 fluorescent particle retention versus time at pH 6 containing surfactants for a UPE microporous membrane only, and two filter member samples that include an UPE microporous membrane, a nylon nanofiber layer (abbreviated as NNF or NF in Example 3), and a non-woven nylon support
Figure 13:
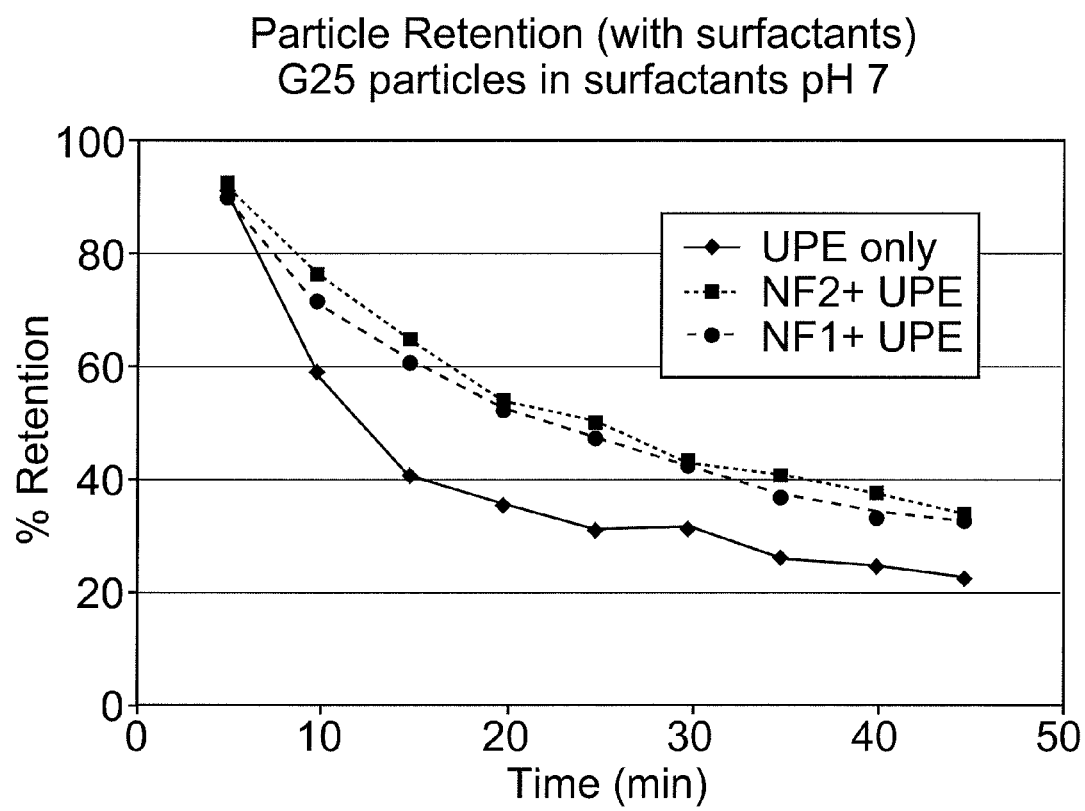
FIG. 13 is a graph of results from Example 3 showing percent G25 fluorescent particle retention versus time at pH 7 with surfactants for a UPE microporous membrane only, and two filter member samples that include a UPE microporous membrane, a nylon nanofiber layer (abbreviated as NNF or NF in Example 3), and a non-woven nylon support

Once the downstream process solution reached a stable surfactant concentration, as measured by a surface tensiometer, G25 particles were injected at a known concentration upstream of the filter. Samples were collected every 5 minutes upstream and downstream of the filter and measured by the fluorescence spectrometer. The results (FIG. 12 and FIG. 13) for the 45 minutes of particle injection with surfactant show that all filters have reduced retention. Without wishing to be bound by theory, these results suggest that the higher retention in only DI water was largely due to non-sieving effect. However, at lower pH 6 and neutral pH 7, the filter members NNF1+UPE and NNF2+UPE with the UPE and Nylon Nanofiber membrane have better retention than the filter with only the UPE membrane.

Example 4

The results of this example, summarized in the Table 4, show air permeability, flow time and retention for different diameter nanofibers on different support layers.

This example measures the effect on air permeability and liquid flow time that the diameter of nanofiber can have on the different supports (non-woven and in one case a microporous membrane). In the samples prepared, the non-woven support layer has much larger size rating in these examples than the nanofiber layer.

TABLE 4

Air permeability, flow time, and retention for different diameter nanofibers on different support layers.

| Sample | Thickness (microns) | Fiber Diameter (nanometer) | Air Permeability <Gurley> (sec/200 ml) | Flow Time at 21° C. (sec/500 ml) | Test Press (MPa) | PSL Retention % (particle size, microns) | | | |
|---|---|---|---|---|---|---|---|---|---|
| | | | | | | 0.196 pH 6 | 0.100 pH 6 | 0.055 pH 6 | 0.100 pH 6 |
| NF-1 | 20 | 50-150 (mean 100) | 3.3 | — 123 | 0.01 0.1 (water) | 100 | 100 | 96 | — |
| NF-2 | 141 | 320-1600 (mean 670) | 0.95 | 39 — | 0.01 0.1 (water) | — | 22 | — | — |
| NF-3 | 79 | 320-830 (mean 670) | 0.53 | 72 — | 0.01 0.1 (water) | — | 16 | — | — |
| NF-4 | 10 | 130 | 1.75 | 211 26 | 0.01 0.1 (IPA) | 100 | 88 | 93 | 36 |
| NF-5 | | 120-130 | 24.1 | — 143 | 0.01 0.1 (IPA) | — | 98 | 97 | 86 |
| NF-6 | | 90-100 | 2.31 | 240 25 | 0.01 0.1 (IPA) | 100 | 99 | 99 | 44 |
| NF-7 | | 120-850 (mean 300) | 1.4 | 61 — | 0.01 0.1 (IPA) | 4 | — | — | — |

Figure 14:
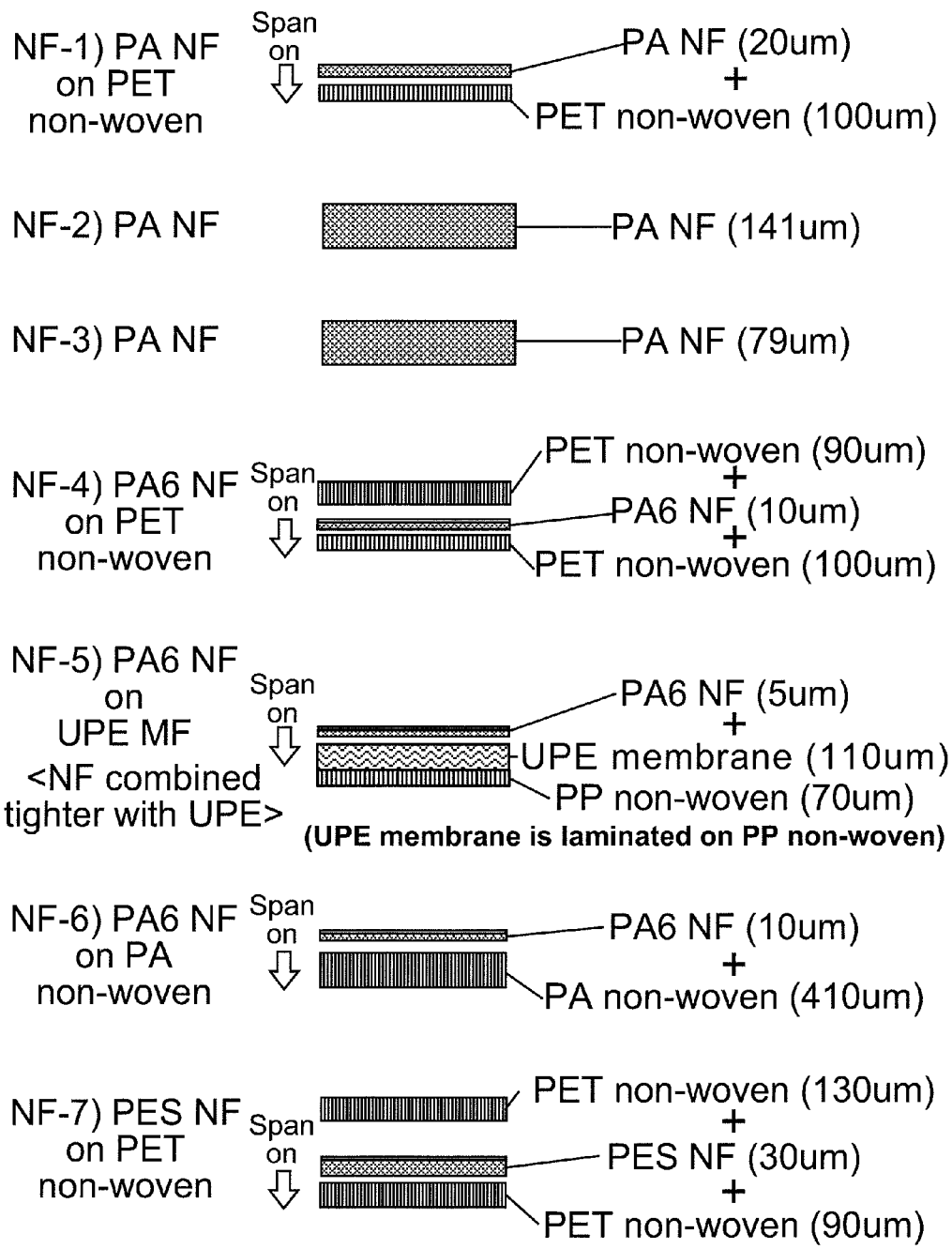
FIG. 14 illustrates various combinations of materials and layer types; the combinations can include a nanofiber layer (NF), for example polyamide nanofibers (PANF), poly(ether sulfone) nanofiber (PES NF); a non-woven (optional) support layer, for example poly(ethylene terephthalate) (PET), polypropylene (PP), polyamide (PA); a microporous membrane, for example ultra high molecular weight polyethylene, polypropylene, and the like; the thickness of the various layers are given in parentheses, the order of the layers are shown.

The nanofiber diameters ranged from about 50 nanometers to about 1600 nanometers. In the Figures below, the various combinations of support layer (e.g. PET non-woven, polypropylene (PP) non-woven, PA non-woven), nanofibers (polyamide nanofiber (PA NF), PES nanofiber), microporous membrane (UPE), thickness of the various layers, the order of the layer, and sample designation in Table (e.g. NF-1, NF-2, etc.) are given in FIG. 14.

The results of this test shown the effect on air permeability and liquid flow time that the diameter of nanofiber can have on the different supports (non-woven and in one case a microporous membrane). The non-woven support layer has much larger size rating in these examples than the nanofiber layer. The various samples show that for samples with nanofiber diameter range below about 150 nanometers or a mean nanofiber diameter of less than 300 nm, for example 200 nanometers or 150 nanometers, that air permeability for the nanofiber on the support is above 1.4 sec/200 milliliters and that these have greater than about 90% PSL retention at pH 6 for 0.055 micron particles and that larger percent retention can be achieved. Samples NF-1, NF-4, NF-5, and NF-6, which had NF layer thicknesses in the range of 5-20 microns, have air permeablities in the range of 1.75 sec/200 ml to 24.1 sec/200 ml and PSL particle retentions of between 88% and 100% for 0.1 micron particles and larger particles.

Example 5

This example illustrates filter members that include one or more layers of nanofibers, a microporous membrane, non-woven porous support(s), and one or more additional support layers or drainage layers.

The six modified Impact® 2 V2 style devices were received for bubble point, pre-wet flow, pressure drop, and particle retention tests. Three devices were made that had Entegris 3 nm asymmetric UPE membrane and the other three devices were made that had Entegris 5 nm asymmetric UPE membrane. UPE membrane is an asymmetric membrane prepared by the methods disclosed in the International Patent Application published under the Patent Cooperation Treaty, Publication No. WO 2006/069307, filed 21, Dec. 2005, Yen, et al the contents of which are incorporated herein by reference in their entirety into this application. Impact® 2 filters with UPE microporous membrane are available from Entegris Inc., Billerica, Mass.

This example shows the particle retention of the Impact® 2 devices with and without the additional layer(s) of 0.2 μm Nylon Nanofiber Within the set of three devices for each 3 nm and 5 nm rated UPE membrane, one device was made with only UPE membrane, while the other two devices were made with UPE membrane and additional one or two layers of 0.2 μm rated Nylon Nanofiber.

TABLE 5

Detailed device information for samples made for Example 5.

| Label | Sample Name | Device # | Membrane area | 0.2 μm Nylon Nanofiber PA6 |
|---|---|---|---|---|
| 3 nm UPE | Impact ® 2 V2 3 nm UPE | 2009-247-1 | 880 cm$^2$ | NO |
| 3 nm UPE + 1 Nylon NF Layer | Impact ® 2 V2 3 nm UPE Type 1 | 2009-247-3 | 880 cm$^2$ | YES one layer |
| 3 nm UPE + 2 Nylon NF Layer | Impact ® 2 V2 3 nm UPE Type 2 | 2009-247-5 | 880 cm$^2$ | YES two layers |
| 5 nm UPE | Impact ® 2 V2 5 nm UPE | 2009-247-2 | 880 cm$^2$ | NO |
| 5 nm UPE + 1 Nylon NF Layer | Impact ® 2 V2 5 nm UPE Type 1 | 2009-247-4 | 880 cm$^2$ | YES one layer |

TABLE 5-continued

Detailed device information for samples made for Example 5.

| Label | Sample Name | Device # | Membrane area | 0.2 μm Nylon Nanofiber PA6 |
|---|---|---|---|---|
| 5 nm UPE + 2 Nylon NF Layer | Impact ® 2 V2 5 nm UPE Type 2 | 2009-247-6 | 880 cm$^2$ | YES two layers |

All the retention tests (different pH 6-8, and different flow rates) were performed on the same devices in this example. The inventors would expect to see greater differentiation of retention at different pH and flow rate if each test was performed on a new device.

One or more Nylon nanofiber layers had a thickness of about 2 microns, an average size rating of 0.2 microns or about 0.2 microns. The nanofiber diameter was in the range of 100 nanometers to 150 nanometers or about 100 nanometers to about 150 nanometers. The size rating for the nanofiber layer was determine by using the same bubble point technique as used for the microporous membrane. The diameter average for the nanofibers in a nanofiber layer was measured by SEM of a random sample of fibers and averaging the values.

Non-woven spunbond porous support from Asahi Kasei was used, the two versions of this non-woven porous support are designated 5040 and 5030 have basis weights of 40 g/m$^2$ or 30 g/m$^2$ respectively. The nylon nanofiber was deposited on this non-woven porous support. A polymeric netting made from polyethylene, available from Delstar, Del., was used as an outer drainage layer. In Table 6 this netting is abbreviated as "PE net".

Sample filters in Table 5 or Table 6 were leak tested at 0.34 MPa for 60 seconds. The samples were low frequency cleaned for 5 min. A visual IPA bubble point (BP) of the device was measured for each device. Each sample was flushed with water and then a water flow rate test performed on each device. The devices were subsequently cleaned as follows: 1$^{st}$ Acid cleaning (60% IPA, 0.1 Normal HCl for 3 hrs); acid extraction with water at 2 liters per minute for 5 minutes; 2$^{nd}$ acid cleaning (60% IPA, 0.1 Normal HCl for 12 hours); acid extraction with water at 2 liters per minute for 5 minutes. The units were dried at 70° C.

Prior to any testing, devices were flushed with approximately 250 milliliters of isopropyl alcohol (IPA) to fully wet the microporous membranes. The devices were thoroughly vented and then flushed with DI water for 30 minutes to 60 minutes.

The results in Table 6 for the prewet water flow rate for filter member samples with one or more nanofiber layers with the 3 nanometer asymmetric microporous membrane shows that the flow rate in liters per minute at 0.06 MPa of pressure is about the same (0%) for 2 layers of nanofiber (0.25 liters per minute at 0.06 MPa) and the flow rate is about 12% less for one layer of nanofiber (0.022 liters per minute at 0.06 MPa). The results of this example for filter members with one or more nanofiber layers with the 5 nanometer asymmetric microporous membrane shows that the flow rate in liters per minute at 0.06 MPa of pressure is about 7% less for two layers of nanofiber (0.38 liters per minute at 0.06 MPa) and the flow rate is about the same (0%) for one layer of nanofiber (0.41 liters per minute at 0.06 MPa).

TABLE 6

Visual bubble point and water flow rate result Example 5 samples.

| Sample No. | Filter Lot # | Sample # | Visual IPA Bubble Point Mean [psi] | Prewet Water flow rate [L/min] at 0.06 MPa |
|---|---|---|---|---|
| 2009-247-1 Impact® 2 V2 3 nm UPE; PE net + Asy3nm + PE net | Asy 3 nm | 1<br>2<br>Avg. | >50<br>>50 | 0.27<br>0.22<br>0.25 |
| 2009-247-1 Impact® 2 V2 5 nm UPE; PE net + Asy5nm + PE net | | 1<br>2<br>Avg. | >45<br>>45 | 0.41<br>0.41<br>0.41 |
| 2009-247-3 Impact® 2 V2; 3 nm UPE DUO Type 1; PE net + 5040 NNF + Asy3nm + PE net | Asy 3 nm | 1<br>2<br>3<br>Avg. | >50<br>>50<br>>50 | 0.24<br>0.22<br>0.2<br>0.22 |
| 2009-247-4 Impact® 2 V2; 5 nm UPE DUO Type 1; PE net + 5040 NNF + Asy5nm + PE net | Asy 5 nm | 1<br>2<br>3<br>Avg. | >45<br>>45<br>>45 | 0.40<br>0.40<br>0.42<br>0.41 |
| 2009-247-5 Impact® 2 V2; 3 nm UPE DUO Type 2; PE net + 5030 NNF + 5030 NNF + Asy3nm + PE net | Asy 3 nm | 1<br>2<br>3<br>Avg. | >50<br>>50<br>>50 | 0.26<br>0.22<br>0.26<br>0.25 |
| 2009-247-5 Impact® 2 V2; 5 nm UPE DUO Type 2; PE net + 5030 NNF + 5030 NNF + Asy5nm + PE net | Asy 5 nm | 1<br>2<br>3<br>Avg. | >45<br>>45<br>>45 | 0.37<br>0.41<br>0.35<br>0.38 |

Figure 15:
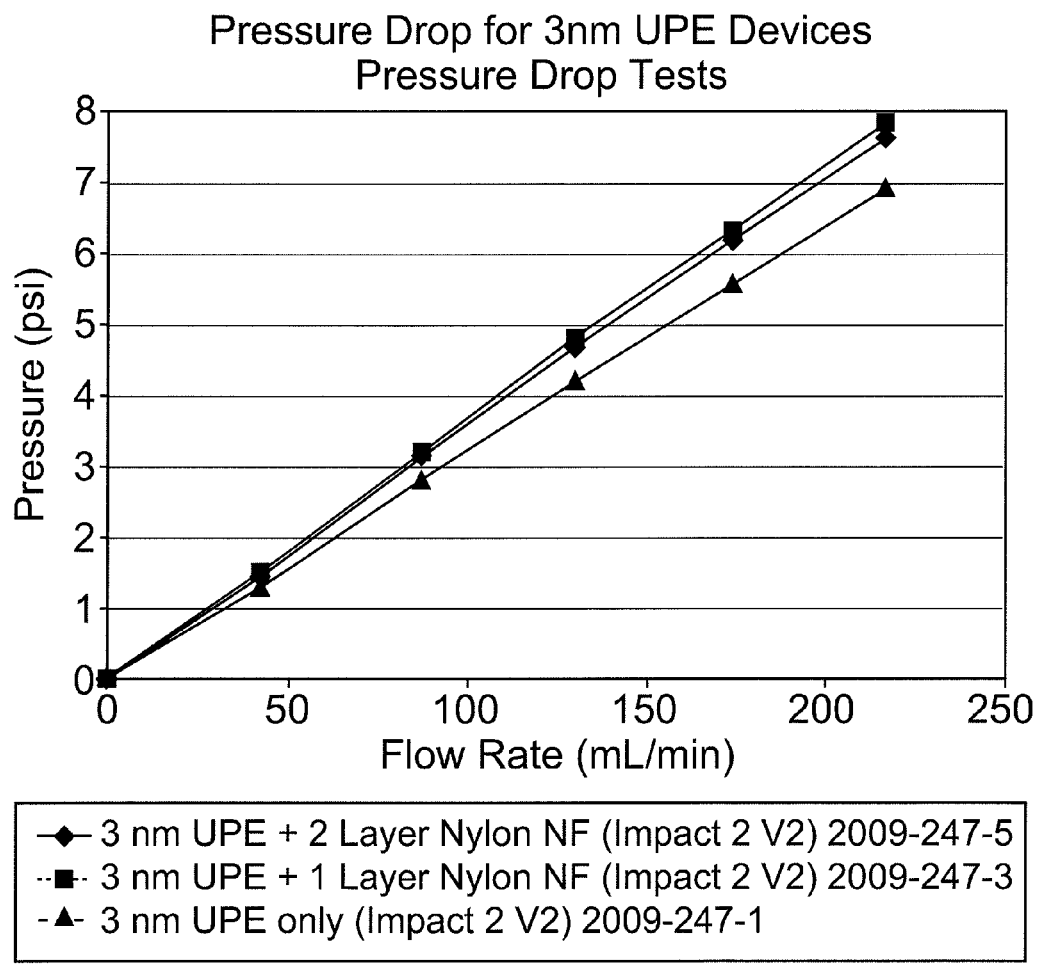
FIG. 15 is a graph illustrating the results of pressure drop tests in Example 5 for a filter device that include 3 nm asymmetric UPE microporous membrane and filter devices that include filter member with 3 nm asymmetric microporous membrane and one or more nanofiber layers.
Figure 16:
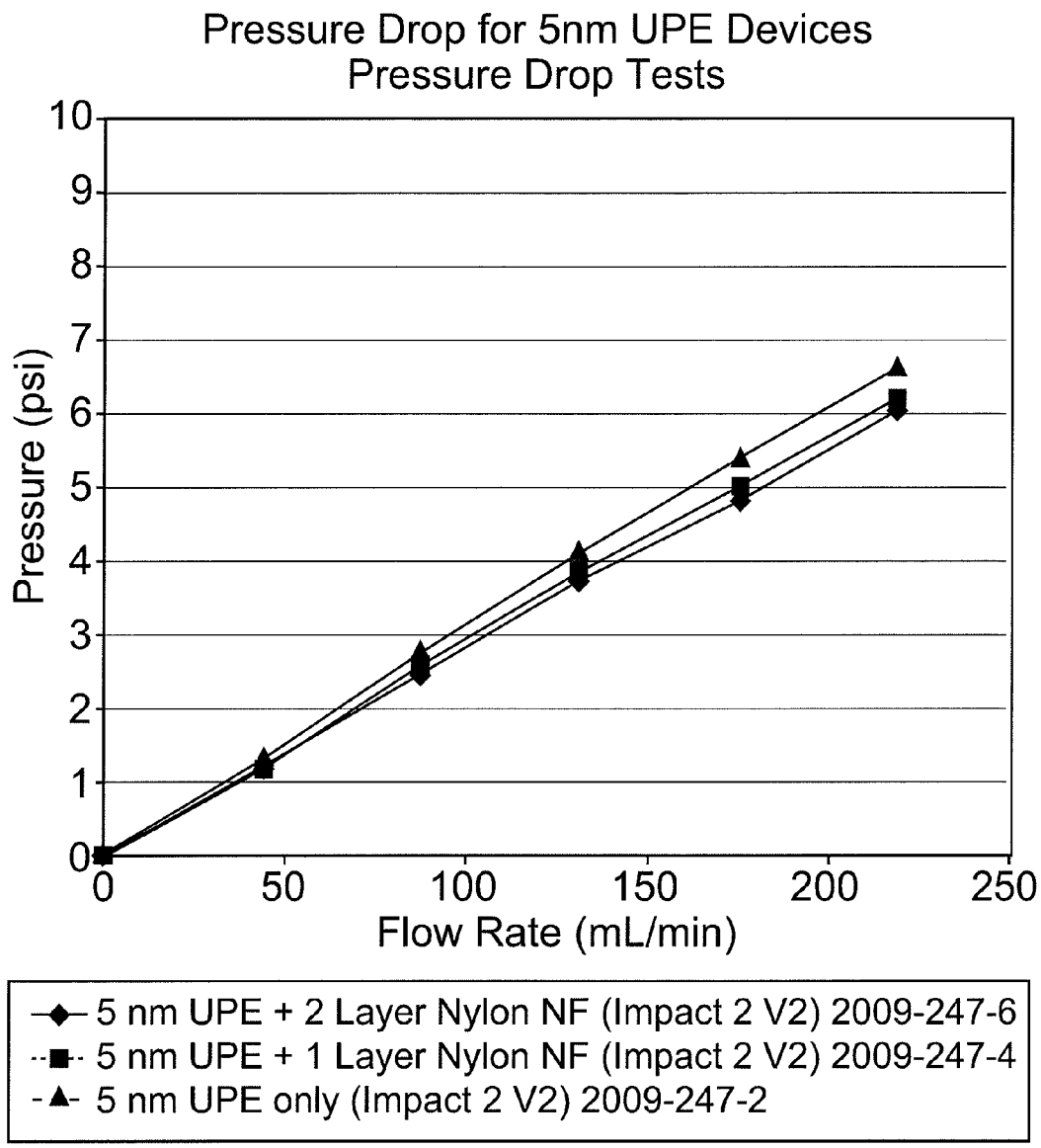
FIG. 16 is a graph illustrating the results of pressure drop tests in Example 5 for a filter device that include 5 nm asymmetric UPE microporous membrane and filter devices that include filter member with 5 nm asymmetric microporous membrane and one or more layers of nanofiber.

The pressure drop of the devices were measured by flowing DI water through each device at a series of flow rates and observing the pressure drop across the device. FIG. 15 and FIG. 16 summarize the pressure drop of the 3 nm and 5 nm devices. For devices with 3 nm or 5 nm UPE membrane, the pressure drop of the devices with one or two layers of nanofiber were about the same or substantially the same in the flow rate range 0 ml/min to about 220 ml/min. In the flow rate range of 0 milliliters per minute to about 220 milliliters per minute, the device with the 3 nm asymmetric microporous UPE membrane only had a pressure drop of about 6.8 psi at about 220 ml/min, while devices with 2 layers or 1 layer of nanofiber and 3 nm asymmetric microporous UPE membrane had slightly higher pressure drop, about 7.6 psi and about 7.8 psi (about 12 percent and 15 percent higher respectively) at about 220 ml/min as shown in FIG. 15. In the flow rate range of 0 milliliters per minute to about 220 milliliters per minute, the device with the 5 nm asymmetric microporous UPE membrane only had a pressure drop of about 6.8 psi at about 220 ml/min, while devices with 2 layers or 1 layer of nanofiber and 5 nm UPE membrane had slightly lower pressure drop, about 6.1 psi and about 6.2 psi (about 7.5 percent and 6 percent lower respectively) at about 220 ml/min as shown in FIG. 16.

All the devices were tested together for particle retention in a single bypass tests stand as illustrated in the FIG. 6. Due to the pressure drops of the UPE membrane, especially the 3 nm UPE membrane, 0.5 liters per minute (1 pm or LPM) was the highest flow rate used with DI water. When surfactants were injected to the DI water upstream stream, the flow rate reduced further and the highest flow rate that was used on the 3 nanometer (nm) UPE devices was 0.36 LPM. The flow rate of 0.36 LPM was the flow rate at which all the 3 nm UPE devices were tested. For comparison, the 5 nm UPE devices were tested at a flow rate of 0.36 LPM and were also evaluated at a flow rate of 0.5 LPM.

For particle retention tests the G25 particles were combined with surfactant, Triton®-X 100, to greatly reduce the non-sieving filtration effects. The surfactant stock solution of approximately 6 wt % was prepared separately in a tank and fully dissolved using a stirrer. This concentrated surfactant solution was found to be stable for more than a week. The concentrated surfactant solution was injected upstream of the device using a pressure vessel at a constant flow rate targeting a 0.1% surfactants concentration, which is above the critical micelle concentration (CMC). To ensure that the surfactant concentration remained above CMC, a surface tensiometer was used to monitor the surface tension of the fluid; a value of 31 dynes correlated to a 0.1% concentration was measured after 5 minutes of surfactant injection. Prior to any particle challenge, the surfactants were injected to establish a steady flow through the devices for at least 10 minutes and control samples at the upstream and downstream of each of the devices were collected. Similarly, the pH of the process stream was controlled by adding requisite amount of 0.1% Potassium hydroxide KOH or 0.1% HCL solution using a pH pump.

The G25 particles were injected at a known concentration upstream of the device for 30 minutes. Samples were collected both upstream and downstream of the sample filter device every 5 minutes and particles in the upstream and downstream sample measured by the Hitachi F-7000 FL spectrometer.

Fluorescence Particle Retention Tests (with surfactants). The 3 nm UPE devices were first tested with G25 fluorescence particles with the addition of surfactant to the process stream to greatly reduce the non-sieving effects. The flow rate through each device: 3 nm UPE, 3 nm UPE+1 layer NF, and 3 nm UPE+2 layers NF were maintained at 0.36 LPM. Once the downstream process solution reached a stable surfactant concentration at around 5 minutes, control samples were collected upstream and down stream of each device prior to particle challenge. Then G25 particles were injected at a known concentration upstream of the device for the duration of 30 minutes. Samples were collected every 5 minutes at upstream and downstream of the device and measured by the fluorescence spectrometer.

Figure 17:
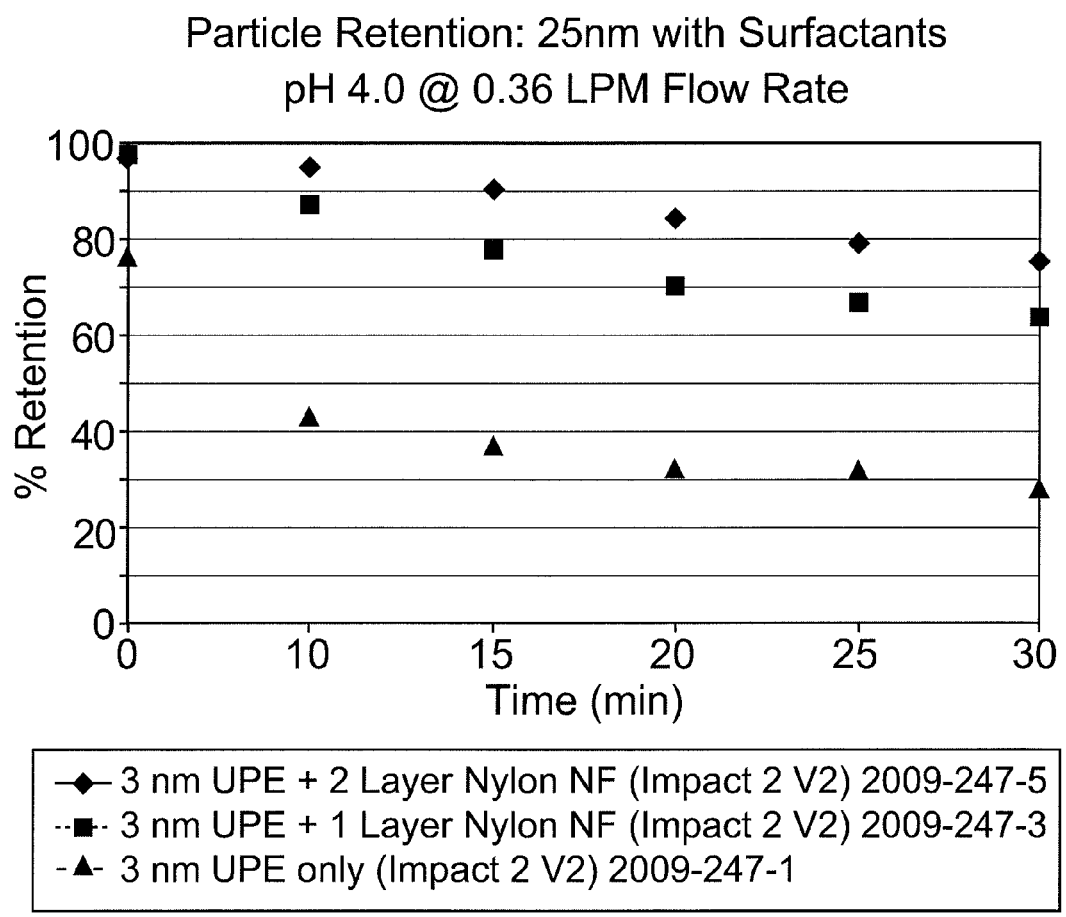
FIG. 17 is a graph illustrating the results of particle retention tests using 25 nm G25 PSL particles with surfactants for filter devices at a pH of 4 and a flow rate of 0.36 liters per minute, the filter devices include those with 3 nm asymmetric microporous membrane and no nanofiber layer and filter devices that include a filter member with 3 nm asymmetric microporous membrane and one or more nanofiber layers.
Figure 18:
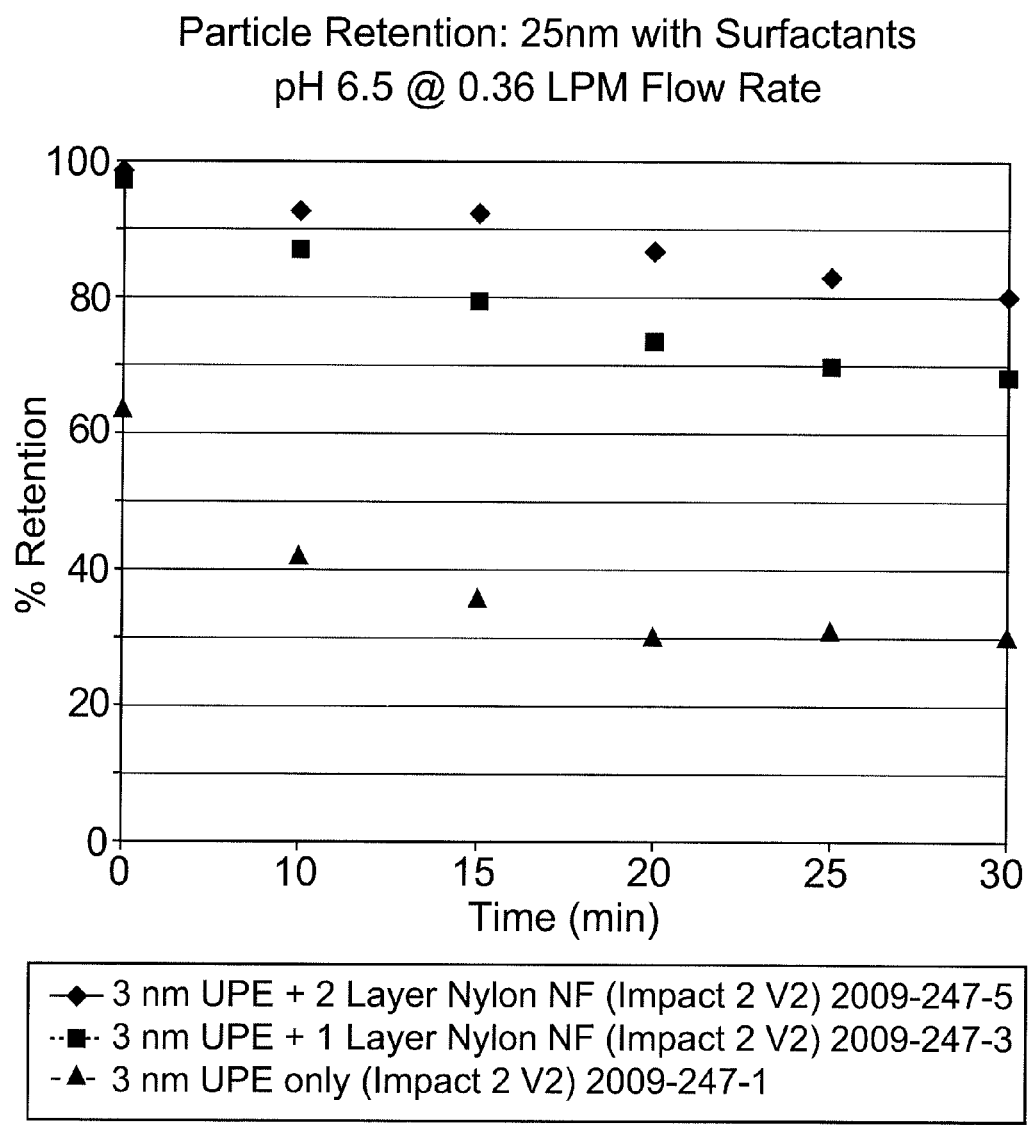
FIG. 18 is a graph illustrating the results of particle retention tests using 25 nm G25 PSL particles with surfactants for filter devices at a pH of 6.5 and a flow rate of 0.36 liters per minute, the filter devices include those with 3 nm asymmetric microporous membrane and no nanofiber layer and filter devices that include a filter member with 3 nm asymmetric microporous membrane and one or more nanofiber layers.
Figure 19:
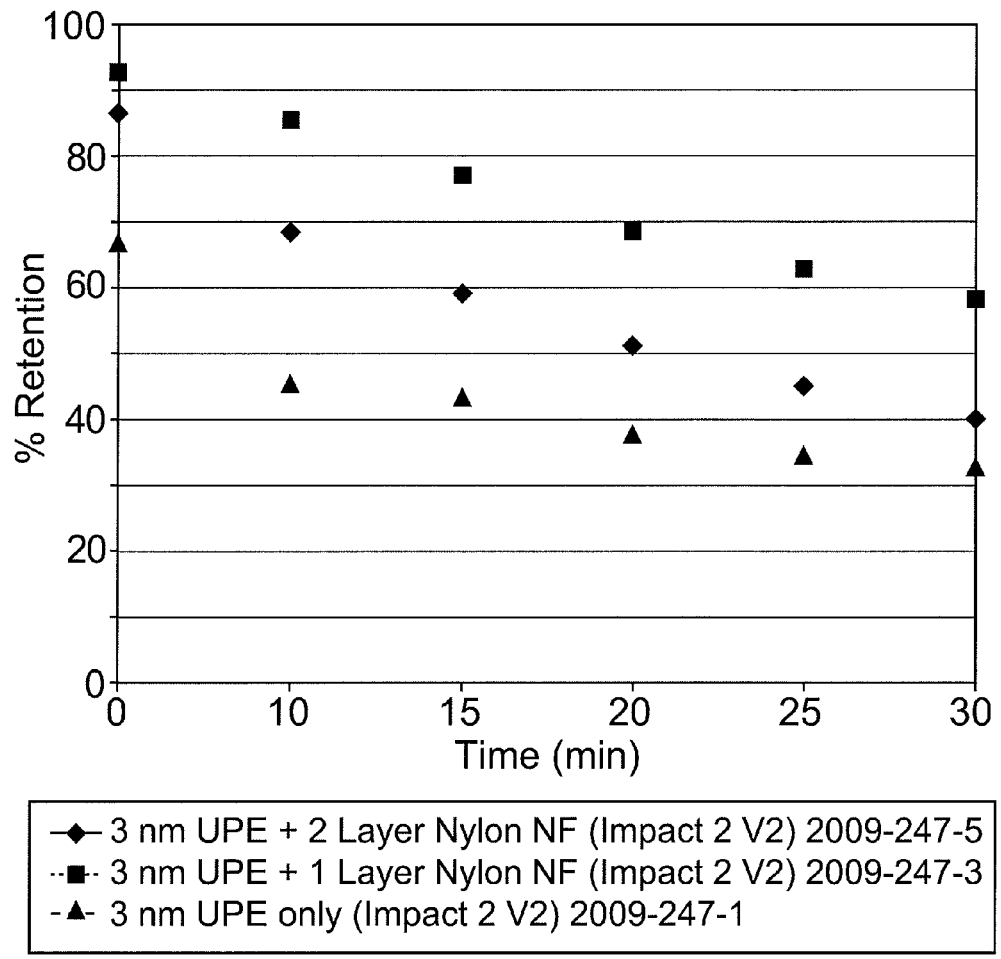
FIG. 19 is a graph illustrating the results of particle retention tests using 25 nm G25 PSL particles with surfactants for filter devices at a pH of 8.5 and a flow rate of 0.36 liters per minute, the filter devices include those with 3 nm asymmetric microporous membrane and no nanofiber layer and filter devices that include a filter member with 3 nm asymmetric microporous membrane and one or more nanofiber layers.

FIG. 17, FIG. 18, and FIG. 19 are the particle retention data of 3 nm UPE devices tested at neutral (pH ~6.5), low pH 4.0 and high pH 8.5 conditions respectively. At low and neutral pH (FIG. 17 and FIG. 18), the retention of 25 nm particles is significantly better for the device with UPE membrane and addition layer of 0.2 μm Nylon Nanofiber compared to that of the device with only UPE membrane. There is a further improvement in retention for the devices with UPE microporous membrane and two layers of 0.2 μm Nylon Nanofiber, especially at higher monolayers coverage. Even though the non-sieving effects are greatly reduced with surfactants, these results suggest that the devices with the additional Nylon Nanofiber layers are affected less than the device with only the UPE membrane. It appears that the presence of Nylon Nanofiber layers on the UPE membrane is showing higher non-sieving effects and thereby significantly improves retention of very small 25 nm particles.

When the same devices are tested at pH 8.5, the differentiation of retention between devices with only UPE and UPE with additional layer 0.2 um Nylon Nanofiber is not as large as seen at neutral and low pH. It is very likely that the non-sieving effects from the Nylon Nanofiber are not very strong at high pH.

Figure 20:
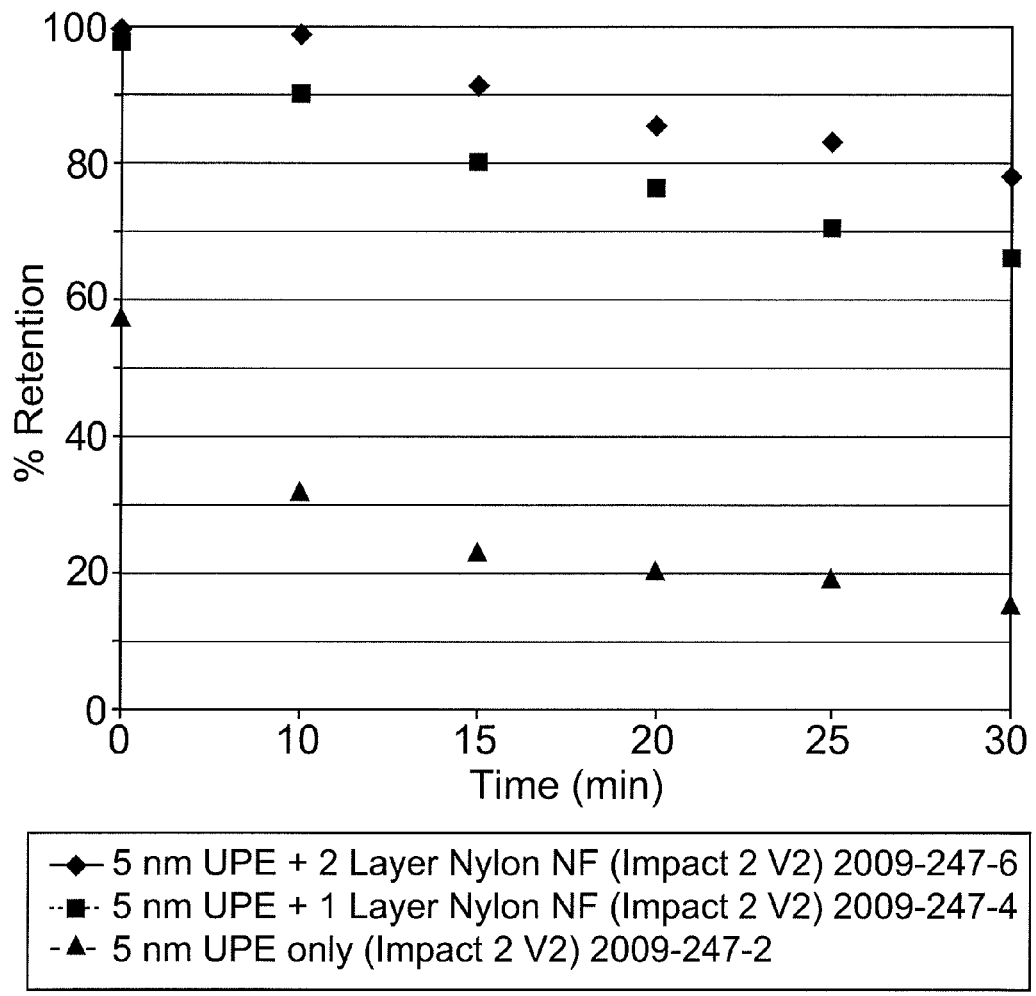
FIG. 20 is a graph illustrating the results of particle retention tests using 25 nm G25 PSL particles with surfactants for filter devices at a pH of approximately 6.5 and a flow rate of 0.36 liters per minute, the filter devices include those with 5 nm asymmetric microporous membrane and no nanofiber layer and filter devices that include a filter member with 5 nm asymmetric microporous membrane and one or more nanofiber layers.
Figure 21:
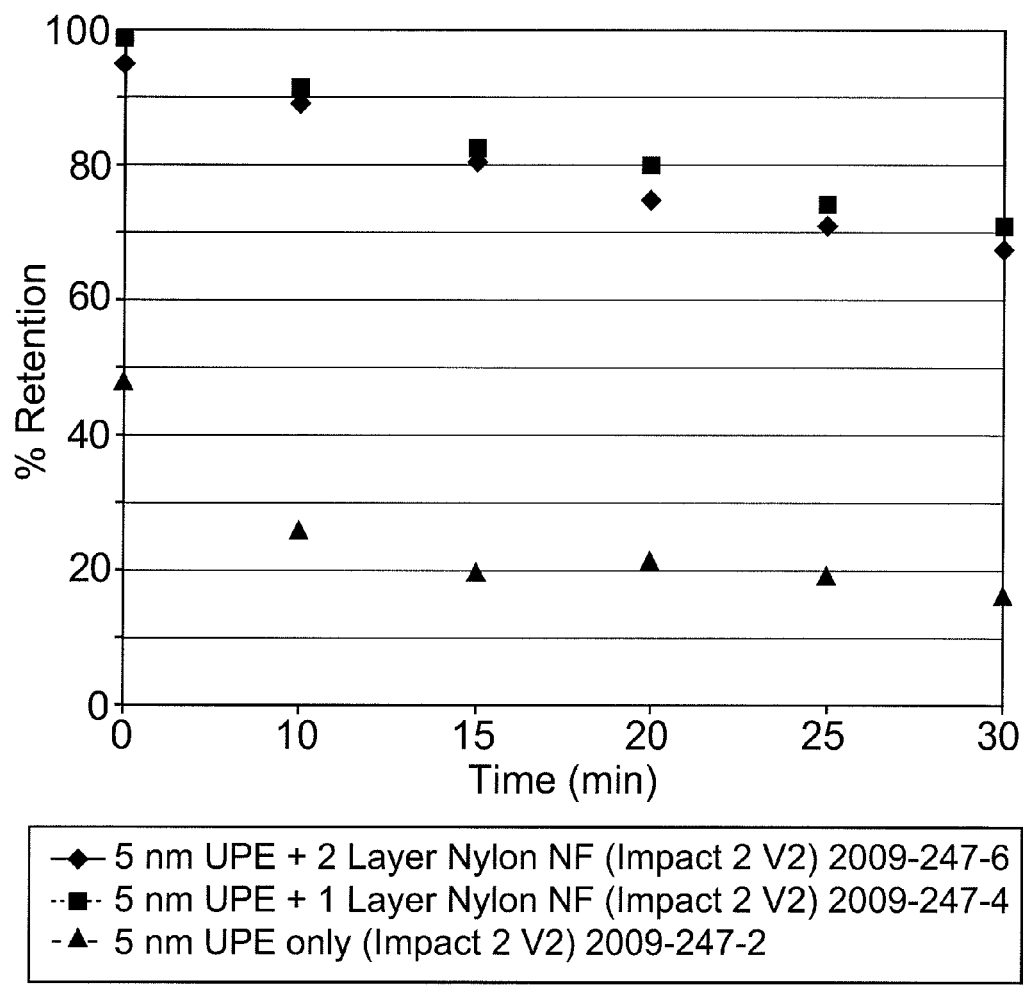
FIG. 21 is a graph illustrating the results of particle retention tests using 25 nm G25 PSL particles with surfactants for filter devices at a pH of approximately 6.5 and a flow rate of 0.5 liters per minute, the filter devices include those with 5 nm asymmetric microporous membrane and no nanofiber layer and filter devices that include a filter member with 5 nm asymmetric microporous membrane and one or more nanofiber layers.

For the devices with 5 nm UPE microporous membrane, the retention for the devices with one or more layers of nanofiber after 30 minutes flow through at 0.36 liters per minute testing at pH 6.5 is about 4 to 6 times greater compared to the retention for the device with UPE microporous membrane alone as shown in FIG. 20. For the devices with 5 nm UPE microporous membrane, the retention for the devices with one or more layers of nanofiber after 30 minutes flow through at 0.5 liters per minute testing at pH 6.5 is about 4 to 5 times greater compared to the retention for the device with UPE microporous membrane alone as shown in FIG. 21.

Similar results were observed for the devices with 5 nm UPE membrane as shown in FIG. 20. The tests conditions (flow rate, pH, particle loadings) are similar to the devices for 3 nm UPE membrane. When the 5 nm devices are tested at a higher flow rate of 0.5 LPM instead of 0.36 LPM, see FIG. 21, similar results are obtained. The differentiation in retention between the device with only UPE and that of the devices with additional layer(s) of 0.2 um Nylon Nanofiber is very large. However, at this higher flow rate, the device with two layers of Nylon Nanofiber does not show much improvement in retention over the device with one layer of Nylon NF.

The results of these tests show that under similar conditions of pH and flow rate that the overall the retention of 3 nm UPE membrane is better than that of the 5 nm UPE membrane and this result is consistent with the flow rate on the devices with 3 nm and 5 nm membrane devices.

The 25 nm particle challenge with the addition of surfactants at low and neutral pH shows that there is a significant improvement in retention for device with UPE membrane and additional layer(s) of 0.2 um Nylon Nanofiber and porous support compared to the device with only UPE microporous membrane. In addition, the device with 2 layers of Nylon Nanofiber shows even further improvement in retention, especially at higher monolayers particle coverage.

Even though the addition of surfactants greatly reduces the non-sieving effects, and without wishing to be bound by theory, these results suggests that the non-sieving effects from the Nylon Nanofiber layers are relatively higher compared to the devices with only UPE membrane.

At higher pH of 8.5, for Example FIG. 19, the differentiation of retention between only UPE and UPE+addition Nylon Nanofiber layer devices is reduced compared to retention of the same devices at lower pH conditions shown in FIG. 18. However the retention of the 3 nm UPE and 2 layers of nylon nanofiber (2009-247-5), is about twice the retention of the 3 nm UPE only (2009-247-1) after 30 minutes at a flow rate of 0.36 liters per minute. Without wishing to be bound by theory, it may be that the non-sieving effect from the Nylon Nanofiber is reduced at higher pH.

The results of this example show that the filter members with one or more nanofiber layers and microporous membrane have substantially the same pressure drop as the microporous membrane alone that is used in the filter member, FIG. 15 and FIG. 16 and the filter members have improved retention of 25 nm PSL particles with surfactants at 0.36 LPM at a pH of 6.5 that ranges from 40 percent or about 40 percent to 50 percent or about 50 percent after 30 minutes for 3 nm microporous membrane as shown in FIG. 18, and ranges from to 50 percent or about 50 percent to 60 percent or about 60 percent after 30 minutes for 5 nm microporous membrane as shown in FIG. 20

Although the present invention has been described in considerable detail with reference to certain embodiments thereof, other versions are possible. Therefore the spirit and scope of the appended claims should not be limited to the description and the versions contain within this specification.

What is claimed is:

1. A filter member, comprising:
an upstream layer of polymeric nanofibers overlying an asymmetric microporous membrane, the asymmetric microporous membrane comprising ultra high molecular weight polyethylene and having a size rating of less than 0.1 microns, the filter member having:
a) a liquid pressure drop in a test liquid that is less than a liquid pressure drop of the asymmetric microporous membrane in the test liquid or b) a liquid pressure drop in a test liquid that is within 15% of a liquid pressure drop of the asymmetric microporous membrane in the test liquid, wherein the test liquid is water or an organic liquid or comprises between 0.1% (weight/weight) and 0.3% (weight/weight) surfactant in water; and
a particle retention under sieving conditions for test particles that is greater than a particle retention under sieving conditions of the asymmetric microporous membrane for the test particles.

2. The filter member of claim 1, further including a porous support, the layer of polymeric nanofibers being interposed between the porous support and the asymmetric microporous membrane.

3. The filter member of claim 1, wherein the asymmetric microporous membrane has a size rating of between 0.001 microns and 0.05 microns.

4. The filter member of claim 3, further comprising a first support layer overlying the layer of polymeric nanofibers and a second nanofiber layer overlying the first support layer.

5. The filter member of claim 1, wherein:
the layer of polymeric nanofibers has a size rating that is the same as or larger than the size rating of the asymmetric microporous membrane and is characterized by an isopropyl alcohol (IPA) flow time of 20 seconds to 200 seconds for 500 milliliters of IPA at a pressure of 0.10 MPa and a temperature of 21° C.,
the asymmetric microporous membrane is characterized by a bubble point greater than 0.206 MPa for IPA and an IPA flow time greater than 500 seconds for 500 milliliters of IPA at a pressure of 0.10 MPa and temperature of 21° C.,
the filter member further comprises a non-woven support overlying the layer of polymeric nanofibers and is characterized by an IPA flow time that is no greater than 100 seconds more than the IPA flow time of the asymmetric microporous membrane for 500 milliliters of IPA at a pressure of 0.10 MPa and temperature of 21° C.,
the polymeric nanofibers have a diameter in a range of 50 nanometers to 200 nanometers, and
a liquid particle retention for said filter member for approximately 25 nanometer fluorescent polystyrene latex beads in a second test liquid comprising a surfactant between 0.1% weight/weight and 0.3% weight/weight, at test particle coverage on the filter member of between 1% monolayer coverage and 30% monolayer coverage, is substantially the same as or is greater than the liquid particle retention of the asymmetric microporous membrane for the 25 nanometer fluorescent polystyrene latex beads under the same conditions.

6. The filter member of claim 5, wherein the size rating of the asymmetric microporous membrane is between 0.001 microns and 0.05 microns.

7. The filter member of claim 5, wherein the nanofiber layer is nylon and the non-woven support is nylon.

8. The filter member of claim 5, wherein the test particle coverage on the filter member is between 10% and 30% monolayer coverage.

9. The filter member of claim 5, wherein:
the test liquid is 0.1% weight/weight Triton X-100 in water and the liquid pressure drop of the filter member in the test liquid at a flow rate of 30 milliliters/minute at room temperature is between 0% and 15% less than the pressure drop of the asymmetric microporous membrane in the test liquid; and
the test particle coverage is between 1% monolayer coverage and 5% monolayer coverage and the second test liquid comprises 0.3 weight percent sodium dodecylsulfate.

10. The filter member of claim 9, wherein the layer of polymeric nanofibers is interposed between the non-woven support and the asymmetric microporous membrane.

11. The filter member of claim 9, wherein the asymmetric microporous membrane has a size rating of 0.05 microns or less.

12. The filter member of claim 9, wherein the layer of polymeric nanofibers comprises nylon 6.

13. The filter member of claim 12, wherein the layer of polymeric nanofibers has a base weight of between 1 gram per meter squared and 3 grams per meter squared.

14. The filter member of claim 13, wherein the layer of polymeric nanofibers has a thickness of between 2 microns and 10 microns.

15. The filter member of claim 1, wherein the layer of polymeric nanofibers is formed from a polyamide or a polymer comprising a polyamide.

16. The filter member of claim 1, wherein the layer of polymeric nanofibers has a size rating that is the same as or larger than the size rating of the asymmetric microporous membrane.

* * * * *